United States Patent
Beach et al.

(10) Patent No.: US 11,053,773 B2
(45) Date of Patent: Jul. 6, 2021

(54) SYSTEM AND METHOD FOR DELIVERING A FLOWABLE SUBSTANCE AND BOREHOLE SEALING

(71) Applicant: AUSTRALIAN MUD COMPANY PTY LTD, Balcatta (AU)

(72) Inventors: Andrew Beach, Bodington (AU); Justin Bergh, Gwelup (AU); Scott Sholer, Hamilton Hill (AU); Gavin McLeod, Attadale (AU)

(73) Assignee: Australian Mud Company Pty Ltd, Balcatta (AU)

(*) Notice: Subject to any disclaimer, the term of this patent is extended or adjusted under 35 U.S.C. 154(b) by 260 days.

(21) Appl. No.: 16/321,957

(22) PCT Filed: Aug. 2, 2017

(86) PCT No.: PCT/AU2017/050812
§ 371 (c)(1),
(2) Date: Jan. 30, 2019

(87) PCT Pub. No.: WO2018/023162
PCT Pub. Date: Feb. 8, 2018

(65) Prior Publication Data
US 2019/0178051 A1 Jun. 13, 2019

(30) Foreign Application Priority Data
Aug. 2, 2016 (AU) .................................. 2016903044

(51) Int. Cl.
*E21B 33/138* (2006.01)
*C09K 8/42* (2006.01)
(Continued)

(52) U.S. Cl.
CPC .............. *E21B 33/138* (2013.01); *C09K 8/04* (2013.01); *C09K 8/42* (2013.01); *C09K 8/508* (2013.01); *E21B 27/02* (2013.01); *E21B 33/124* (2013.01)

(58) Field of Classification Search
CPC ...... E21B 33/138; E21B 27/02; E21B 33/124; C09K 8/04; C09K 8/508; C09K 8/42
See application file for complete search history.

(56) References Cited

U.S. PATENT DOCUMENTS

| | | | | |
|---|---|---|---|---|
| 194,667 A | * | 8/1877 | Fithian | E21B 27/02 166/169 |
| 1,371,627 A | * | 3/1921 | Kirtley | E21B 27/02 294/68.25 |

(Continued)

*Primary Examiner* — Steven A MacDonald
(74) *Attorney, Agent, or Firm* — Felix L. Fischer

(57) ABSTRACT

A system (10) delivers of a flowable substance S to a remote location through a conduit (144). The system (10) has a body 12 with first and second portions (14,16) and at least two plugs (P1, P2) associated with the body (12) so that in a first configuration the plugs (P1, P2) are spaced apart and form a sealed region (20) for holding a volume of the substance S, and, in a second configuration at least the second plug (P2) is disposed in the second portion wherein the substance S can flow in a downstream direction past or through the second plug and out of the body (12). A first valve (66) is coupled with the body (12) and has: (a) and opened state where the substance S is able to flow out of the body (12) and (b) a closed state where the first valve (66) prevents flow of the substance S out of the body (12) and prevents flow of a further fluid into or out of the body (12) while allowing a bypass flow of the further fluid in an upstream direction through a bypass flow path (110) of the first valve (66) to facilitate travel of the system (10) through a column of the further fluid in the conduit (144).

23 Claims, 9 Drawing Sheets

(51) Int. Cl.
*E21B 27/02* (2006.01)
*E21B 33/124* (2006.01)
*C09K 8/04* (2006.01)
*C09K 8/508* (2006.01)

(56) References Cited

U.S. PATENT DOCUMENTS

| | | | | |
|---|---|---|---|---|
| 1,449,672 A * | 3/1923 | Hallvarson | ............. | E21B 27/02 |
| | | | | 166/63 |
| 3,199,596 A * | 8/1965 | Wood | .................... | E21B 49/082 |
| | | | | 166/115 |
| 3,213,940 A * | 10/1965 | Wood | .................... | E21B 33/16 |
| | | | | 166/289 |
| 4,547,298 A * | 10/1985 | Novak | .................... | C04B 14/36 |
| | | | | 166/294 |
| 6,595,281 B1 * | 7/2003 | Beach | .................... | E21B 27/02 |
| | | | | 166/169 |
| 6,832,654 B2 * | 12/2004 | Ravensbergen | ........ | E21B 17/06 |
| | | | | 166/177.5 |
| 7,314,080 B2 * | 1/2008 | Giacomino | ............. | E21B 34/14 |
| | | | | 166/105 |
| 2002/0035351 A1 * | 3/2002 | Lodice | .................. | A61M 5/284 |
| | | | | 604/221 |
| 2003/0131991 A1 * | 7/2003 | Hartog | ................... | E21B 47/11 |
| | | | | 166/250.12 |
| 2009/0266546 A1 * | 10/2009 | Hill | ........................ | E21B 49/10 |
| | | | | 166/305.1 |
| 2011/0308799 A1 * | 12/2011 | Tarafdar | .................. | C04B 28/02 |
| | | | | 166/293 |
| 2014/0076563 A1 * | 3/2014 | Lin | ........................ | C04B 26/04 |
| | | | | 166/295 |

* cited by examiner

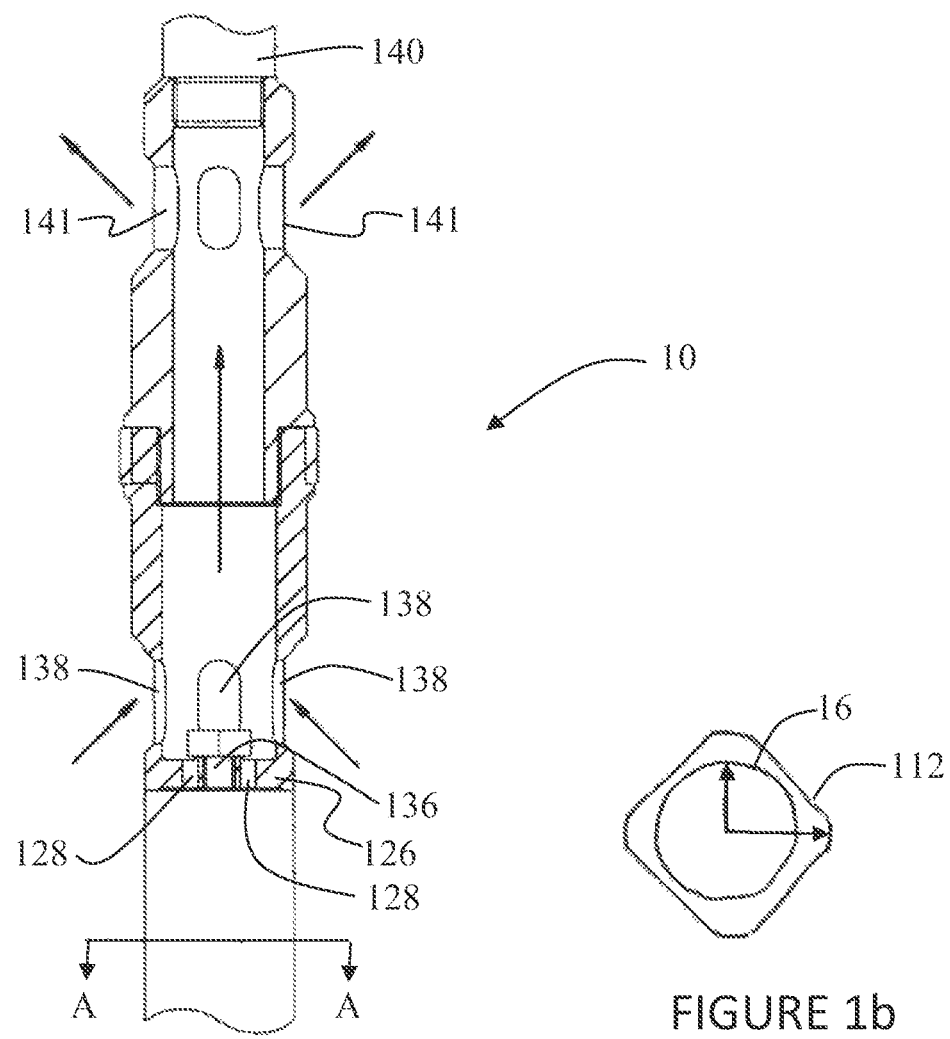
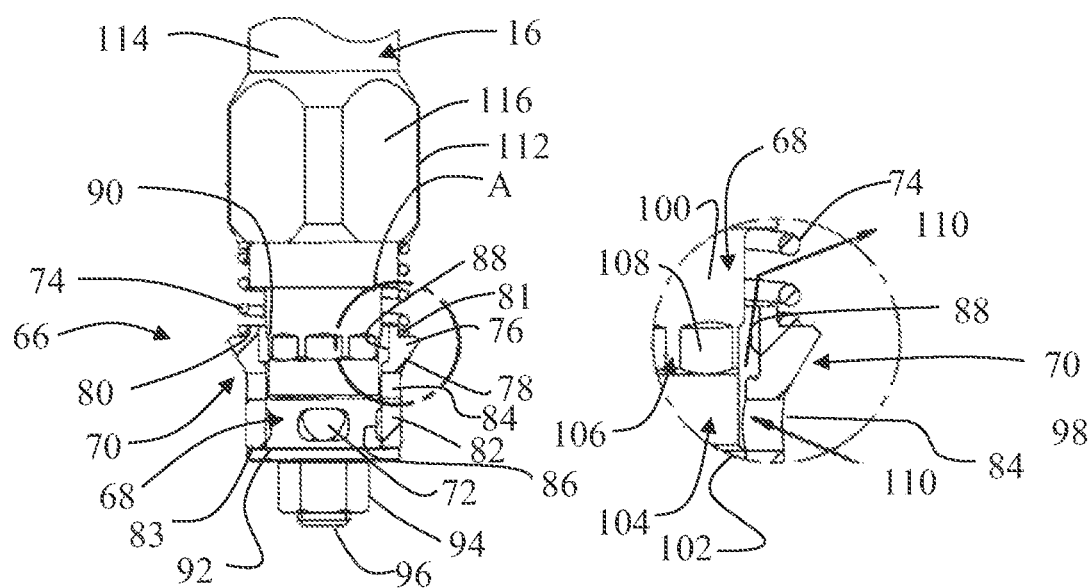
FIGURE 1a
FIGURE 1b
FIGURE 2

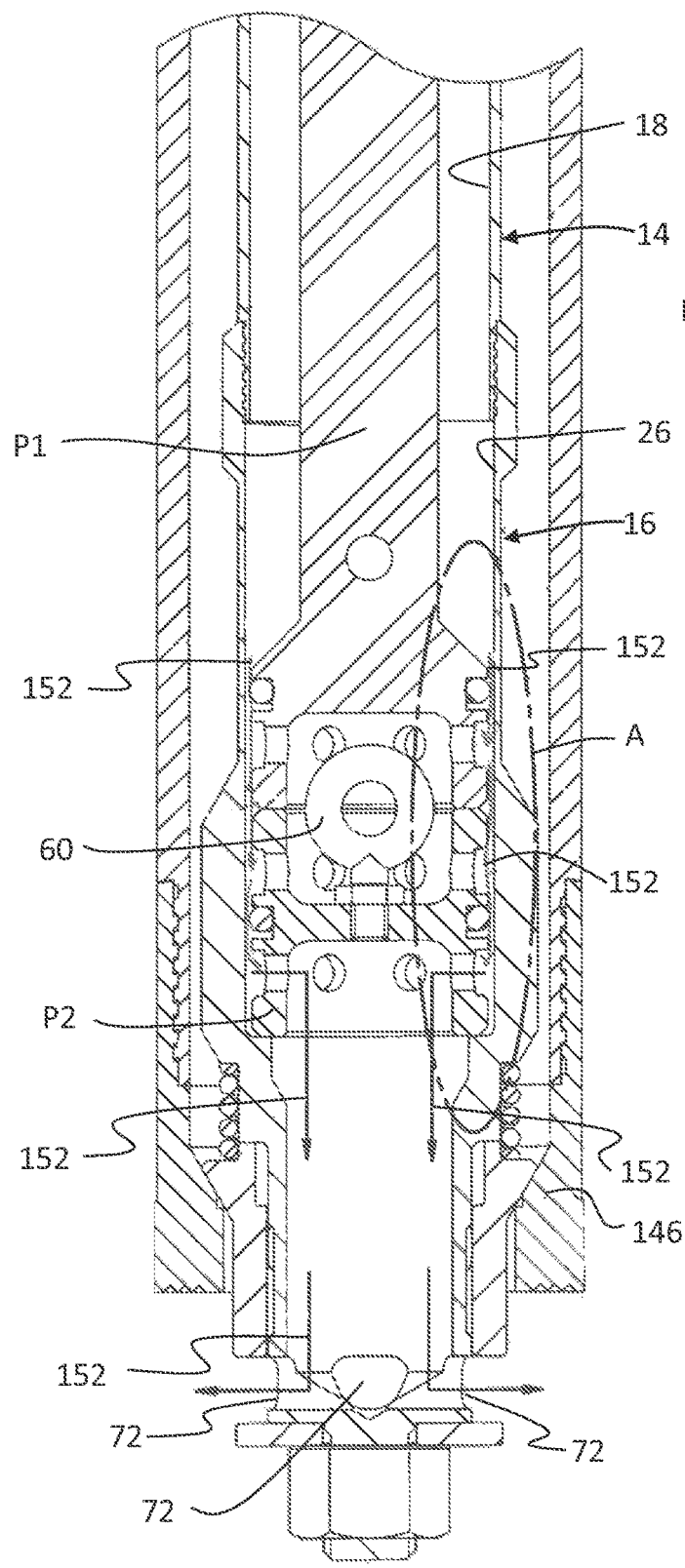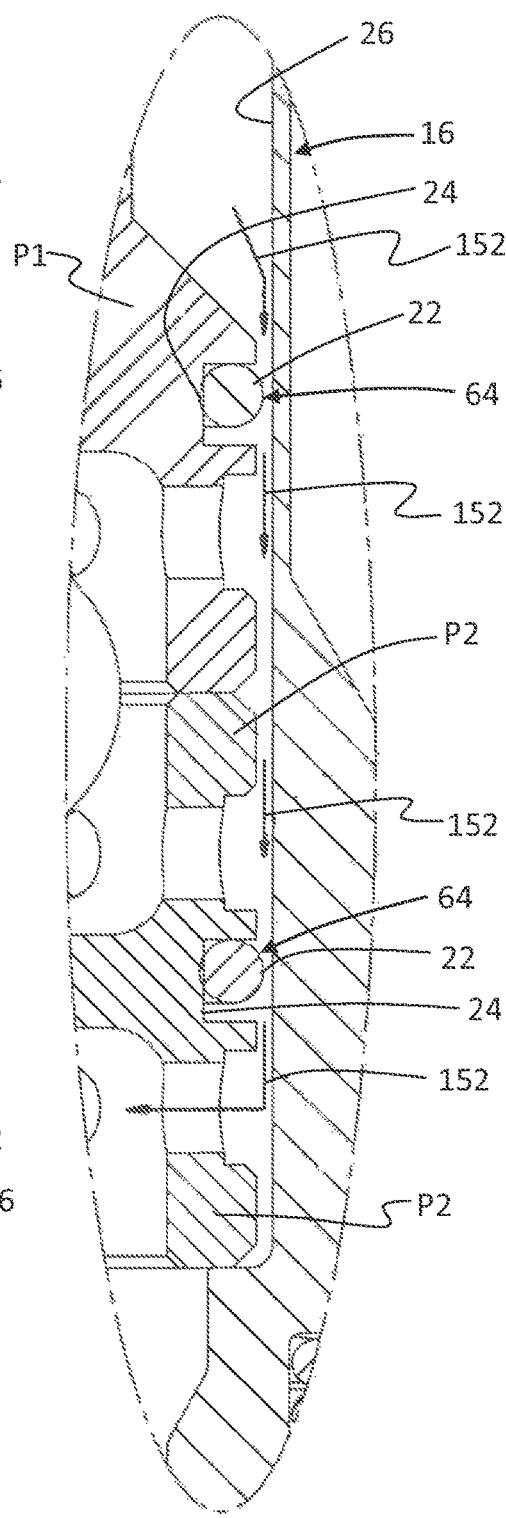
FIGURE 6                    FIGURE 7

SYSTEM AND METHOD FOR DELIVERING A FLOWABLE SUBSTANCE AND BOREHOLE SEALING

REFERENCES TO RELATED APPLICATIONS

This application is a national stage filing under 35 U.S.C. 371 and claims priority of International Application serial no. PCT/AU2017/050812 having an international filing date of 2 Aug. 2017 which in turn claims priority of Australian patent application serial no. 2016903044 filed on 2 Aug. 2016, the disclosures of which are incorporated herein by reference.

TECHNICAL FIELD

A system and method for delivering a flowable substance to a remote location is disclosed. Non limiting examples of the flowable substance include: lubricant, chemical activators, chemical neutralisers, single or multi component grout and sealing compounds.

BACKGROUND ART

In many mining and civil engineering activities it is necessary to deliver grout or lost circulation material (LCM) products for the purposes of sealing or stabilising fractured and/or hygroscopic and swelling ground. For example, in core drilling, in highly fractured ground, it may be necessary to deliver grout to a location in a borehole which may be hundreds or thousands of meters from the ground surface to seal the fractures through which drilling fluids may otherwise flow thereby reducing the fluid pressure within the borehole and leading to the unnecessary wastage of drilling fluids. Similarly, in civil construction, it may be necessary to stabilise fractured ground prior to a concrete pour to prevent ingress of water into a pour site.

In a core drilling situation, grout is typically delivered to the point required by simply pouring it down an open borehole or by pumping it through a drill string. This is clearly an inefficient method and leads to substantial wastage of grout as well as contamination of the interior of the drill string and/or other sections of the borehole that do not require grouting. Additionally time of delivery to the site of application becomes a critical factor as once exposed to the ambient atmosphere or in-hole fluids the grout commences to harden. It is critical that the grout remains in a flowable state until the application location is reached. In a civil construction situation, the grout may be delivered manually.

It should also be noted that traditional grouting or lost circulation procedures have been developed for the oil and gas drilling industry which works on the premise that an annulus between the drill string and the borehole wall is quite wide which is to be contrasted with the hard rock mineral and civil drilling industries which operate with an extremely narrow annulus. This initial premise presumes that a large annular volume must be filled and controlled prior to stabilizing the fractured, swelling or hygroscopic regions within the borehole. One of the negative side effects of this approach is that injecting large volumes of grouts and or LCM can cause excessive in-hole torque problems, reducing penetration rates and productivity and in extreme cases, grout or bog the drill string in the borehole.

While embodiments of the disclosed method and system was initially developed with a view to providing apparatus for delivering flowable substances such as grout to a remote location, embodiments of the disclosed system and method are not limited to this application and may be used for delivering other flowable substances such as grease, oil, pastes and a variety of other Lost Circulation Material (LCM) products such as hydrated cellulose fibers, hygroscopic polymers, and bentonite clays. Indeed embodiments of the disclosed system and method have facilitated the development of the disclosed method and system of forming of a membrane between the borehole wall and drill string to act as a substantial borehole seal.

SUMMARY OF THE DISCLOSURE

In one aspect there is disclosed a system for delivery of a flowable substance to a remote location through a conduit comprising; a body dimensioned to travel inside the conduit, the body having first and second portions and at least two plugs both being moveable in an axial direction within the body, the plugs being associated with the body wherein: in a first configuration of the plugs, a first plug and a second plug are spaced apart in the first portion of the body and together with an inner surface of the first portion form a sealed region for holding a volume of a flowable substance; and, in a second configuration of the plugs, at least the second plug is disposed in the second portion wherein the flowable substance can flow in a downstream direction past or through the second plug and out of the body in response to the application of a force on the first plug in a direction toward the second plug; and a first valve coupled with the body, the first valve having: (a) and opened state where the flowable substance is able to flow out of the body; and (b) a closed state where the first valve prevents flow of the flowable substance out of the body and prevents flow of a further fluid into or out of the body while allowing a bypass flow of the further fluid in an upstream direction through the first valve to facilitate travel of the system through a column of the further fluid in the conduit.

In another aspect there is disclosed a system for delivery of a flowable substance to a remote location through a conduit comprising; a body having an uphole end and a downhole end and configured to travel inside the conduit; at least one port at or near the up hole end; a pressure activated one-way valve inside the body and downstream of the at least one port; the body having first and second portions and at least two plugs both being moveable in an axial direction within the body, the plugs located downstream of the one-way valve and being associated with the body wherein: in a first configuration of the plugs, a first plug and a second plug are spaced apart in the first portion of the body and, together with an inner surface of the first portion, form a sealed region for holding a volume of a flowable substance; and, in a second configuration of the plugs, at least the second plug is disposed in the second portion wherein the flowable substance can flow in a downstream direction past or through the second plug and out of the body in response to the application of a force on the first plug in a direction toward the second plug; wherein when the one way valve is open, fluid pressure can be transmitted through the one way valve to produce the force to move one or more of the plugs toward the down hole end of the body.

The system may comprise a first valve at a downhole end of the body arranged to control passage of the flowable substance out of the body. A portion of the first valve may be configured to abut a stop mechanism within the conduit to prevent travel of the portion of the first valve beyond the stop mechanism. The first valve may have: (a) and opened state where the flowable substance is able to flow out of the body; and (b) a closed state where the first valve prevents flow of the flowable substance out of the body and prevents flow of a further fluid into or out of the body the body while allowing a bypass flow of the further fluid in an upstream direction through the first valve to facilitate travel of the system through a column of the further fluid in the conduit.

The first valve may comprise a nozzle and a collar slidably mounted on the nozzle. The collar and the nozzle may be relatively configured to form a bypass flow path there between when the first valve is in the closed state enabling the bypass flow of fluid through the closed valve. The collar may comprise at least one opening a location intermediate of opposite axial ends of the collar. The at least one opening may form part of the bypass flow path when the first valve is in the closed state. The nozzle may comprise a reduced diameter portion arranged to lie adjacent the at least one opening formed in the collar when the first valve is in the closed state enabling fluid communication between the reduced diameter portion of the nozzle and a region adjacent an outer circumferential surface of the nozzle.

The first valve may be arranged so that bypass flow path is closed when the first valve is in the open state. An embodiment may further comprise a first bypass path closing mechanism arranged to close the bypass flow path when the first valve is in the open state. The first bypass path closing mechanism may be formed by an upstream portion of the nozzle having an outer circumferential surface configured to closely fit inside a portion of the collar provided with the at least one opening. An embodiment may comprise a second bypass path closing mechanism arranged to close the bypass flow path when the first valve is in the open state. The second bypass closing mechanism may be formed by an annular face on the collar and an annular face on the body wherein the annular faces are arranged to contact each other when the first valve is in the open state.

An embodiment may comprise a centraliser located about the body. The centraliser may have an outer surface that fits within a circle of radius R which is smaller than an inner radius of the conduit and larger than an outer radius of the body. The outer surface may be provided with one or more recessed surface portions that lie within the radius R. An embodiment may comprise a fluid pressure activated one-way valve located upstream of the plugs arranged to allow a flow of fluid in a direction through the body toward the first valve while blocking a flow of fluid in direction from the first valve to the one-way valve The second plug may comprise a sealing member, and the body and sealing member may be relatively configured so that when the second plug is in the first configuration the sealing member forms a seal against an inside surface of the first portion of the body, and when the second plug is in the second configuration the flowable substance is able to flow between the sealing member and an inside surface of the second portion of the body. The second portion of the body may be formed with an inner diameter greater than an outer diameter of the sealing member. The inside surface of the second portion may be formed with one or more of flutes or grooves configured to form one or more gaps between the inside surface of the second portion of the body and the sealing member of the second plug.

An embodiment may comprise at least two of the sealed regions which contain respective flowable substances of different composition and/or function.

In an embodiment, one or more of: (a) the number of plugs; (b) an axial length of any one of the plugs; or (c) an axial length of the second portion may be arranged so that, in a third configuration of the plugs where axially adjacent plugs are in mutual abutment and a plug closest to a downstream end of the body is in the second portion, the body together with the plugs forms a flushing fluid flow path allowing fluid which flows into the body upstream of the plugs to flow past the plugs and out of the body.

In an embodiment, one or more of: (a) the number of plugs; (b) an axial length of any one of the plugs; or (c) an axial length of the second portion may be arranged so that, in a third configuration of the plugs where axially adjacent plugs are in mutual abutment the second plug being closest to a downstream end of the body is in the second portion and the first plug being most distant the first plug is positioned to form a seal with the first portion to thereby substantially prevent fluid which flows into the body upstream of the plugs to flow past the plugs and out of the body.

In an embodiment, the first valve may comprise a nozzle having one or more openings, a collar slidably mounted on the nozzle, and a spring arranged to bias the collar in a direction to substantially seal the openings in the nozzle to thereby place the valve in the closed state.

Another aspect discloses a system for delivery of a flowable substance to a remote location comprising; a body having one or more sealed regions for holding respective volumes of a flowable substance; and a first valve controlling flow of fluid into and out of the body, the first valve having a closed state in which fluid is prevented from entering or exiting the body while allowing a bypass flow of fluid through the valve to facilitate travel of the system through a column of the fluid.

In an embodiment, the first valve may comprise a nozzle having one or more openings, a collar slidably mounted on the nozzle, and a spring arranged to bias the collar in a direction to substantially seal the openings in the nozzle to thereby place the valve in the closed state. The collar and the nozzle may be relatively configured to form a bypass flow path between the collar and the nozzle when the valve is in the closed state enabling the bypass flow of fluid through the valve. The bypass flow path may comprise at least one opening formed in the collar at a location intermediate of opposite axial ends of the collar. The bypass flow path may comprise a reduced diameter portion of the nozzle wherein when the valve is in the closed state the at least one opening formed in the collar can provide fluid communication between the reduced diameter portion of the nozzle and a region adjacent an outer circumferential surface of the collar.

The body may comprise a first portion and a second portion. The system may further comprise at least two plugs both being moveable in an axial direction within the body.

The plugs may be associated with the body wherein: in a first configuration of the plugs, a first plug and a second plug are spaced apart in the first portion of the body and together with an inner surface of the first portion form a sealed region for holding a volume of a flowable substance; and, in a second configuration of the plugs, at least the second plug is disposed in the second portion wherein the flowable substance can flow in a downstream direction past or through the second plug and out of the body in response to the application of a force on the first plug in a direction toward the second plug.

An embodiment may comprise a centraliser located about the body. The centraliser may have an outer surface that fits within a circle of radius R smaller than an inner radius of the conduit and larger than an outer radius of the body. The outer surface may be provided with one or more recessed surface portions that lie within the radius R.

Another aspect discloses a method for delivery of a flowable substance to a remote location comprising; sealing a volume of a flowable substance between a first plug and a second plug in a body wherein the plugs form a seal with an inner surface of the first portion; transporting the body containing the flowable substance through a conduit to a dispensing location; providing a first valve at a downstream end of the body to control flow of the flowable substance out of the body and arranging the valve to have a closed state while the body is being transported to the dispensing location, in which the valve prevents flow of the flowable substance out of the body while allowing a bypass flow path of fluid in the conduit through the valve; and applying a force to the to slide the first plug, the flowable substance and the second plug in a downstream direction to a location where a gap is formed between an inside surface of the body and the second plug to enable the flowable substance to flow out of the body.

The method may comprise engaging the valve on a seat or other stop mechanism when the body reaches the dispensing location and transmitting the applied force to the valve to cause a valve to move to an opened state wherein the flowable substance is able to pass out the body through the valve. An embodiment may further comprise closing the bypass flow path through the valve when the valve is moved to the opened state.

The method may comprise rotating the body while dispensing the flowable substance from the body. The method may comprise forming a plurality of sealed regions within the body between respective spaced apart plugs and holding respective volumes of flowable substance in the sealed regions. The volumes of flowable substance may comprise at least two flowable substances of different composition. The flowable substance may be a hydro activated polymer.

Another aspect discloses a method of stabilising or sealing one or more regions of a borehole comprising: loading a volume of a hydro activated polymer into the sealed region of a body of a system as set forth above; transporting the body containing the flowable substance through a conduit to a dispensing location adjacent the one or more regions of the borehole; applying a force to slide the first plug, the flowable substance and the second plug in a downstream direction to a location where a gap is formed between the inside surface of the body and the second plug wherein the force forces the flowable substance to flow out of the body, into the borehole and at least partially in an up-hole direction into an annulus created between the conduit and the region of a borehole.

The method may further comprise rotating the conduit while the flowable substance flows out of the body. The method may further comprise rotating the conduit for a period of time sufficient for the hydro-activated polymer to chemically react with fluids within the borehole to effect a change in the physical characteristics of the polymer.

The method may further comprise formulating the hydro-activated polymer so that when chemically reacted with fluids within the borehole to effect the change in physical characteristics, a surface of the polymer surrounding the conduit forms a slidable and/or lubricating surface against the borehole wall enabling the drill to rotate and move axially relative to the polymer.

The method may comprise using a ground drill as the conduit. The method may comprise, prior to transporting the body, operating the ground drill to drill the borehole; and prior to withdrawing the ground drill, transporting the body through the ground drill to the region of the borehole. The method may comprise, after the hydro-activated polymer has chemically reacted, operating the ground drill to continue drilling and extend the borehole.

The hydro-activated polymer may be a cross linked broad spectrum hydro activated polymer. The annulus may have an outer diameter less than 1.2 times an outer diameter of the drill string. The annulus may have an outer diameter substantially equal to an outer diameter of a drill bit coupled to the drill string. The hydro-activated polymer may be formulated to form a non-permeable and hygroscopic membrane.

Another aspect discloses a method of drilling a borehole using a core drill having a drill string, the method comprising: operating the core drill to drill the borehole; at a point in the drilling of the borehole ceasing drilling, maintaining a downhole end of the drill string near a toe of the borehole being drilled and creating a plasticised hygroscopic and waterproof barrier between a wall of the borehole and the drill string in the region of the toe by: loading a volume of a hydro activated polymer into the sealed region of a body of a system as set forth above; transporting the body through the drill string; forcing the hydro-activated polymer out of the body, into the borehole and between the wall of the borehole and the drill string while rotating the drill string; and continuing to rotate the drill string while the hydro-activated polymer sets between the wall and the drill string to form the plasticised hygroscopic and waterproof barrier.

The method may comprise using the core drill to continue drilling the borehole after setting of the hydro-activated polymer.

Another aspect discloses a method of forming a substantially continuous self-lubricating hygroscopic and water proof barrier on a wall of a borehole formed by a ground drill the method comprising: after drilling a length of the borehole using a ground drill having a drill string and a drill bit, maintaining the drill string in the hole to form an annulus between the drill string and a wall of the borehole; injecting a volume of flowable hydro-activated polymer into the annulus through the drill string; rotating the drill string while the hydro-activated polymer reacts with water in the annulus to form a self-lubricating hygroscopic and waterproof barrier on the wall of the borehole for the length of the borehole.

The method may comprise lifting the drill string from a toe of the borehole to a location adjacent which the weight on bit transitions to 0. The method may comprise operating the ground drill to advance the borehole after setting of the hydro-activated polymer to drill a contiguous adjacent length and repeating the maintaining, injecting and rotating to form a self-lubricating hygroscopic and waterproof barrier on the wall of the borehole for the contiguous adjacent length of the borehole. The ground drill may be a core drill.

The injecting may be performed subsequent to each core run. The flowable substance may be transported through the drill string by the system as set forth above.

Another aspect discloses a composition for use in forming a polymeric material that stabilises a wall of a borehole, comprising: a polymer and a crosslinking agent, wherein the composition is injectable into an annulus formed between a drill located in the borehole and the wall, and wherein, when exposed to an aqueous solution located in the annulus, the composition forms a polymeric material having a Young Modulus in the range of about 0.01-5 GPa, a tensile strength in the range of about 1-100 MPa, and a breaking elongation in the range of about 100%-1000%.

The polymer and the crosslinking agent may be configured to form a polymeric material having a surface that forms a slidable membrane against the wall of the borehole such that a drill located in the borehole is able to move axially relative the polymer. The polymer and crosslinking agent may be configured to form a non-permeable and hydroscopic membrane.

The composition may be configured to gel in the borehole in a range of about 10 seconds to 60 minutes after the composition has contacted the aqueous solution. The gel time may be in the range of 30 seconds to 120 seconds. The composition may comprise about 10-60 wt. % polymer. The composition may be in the form of an emulsion. The polymer may be an ionic polymer having a charge density in a range of about 20-50%, such as about 20-35%. The polymer may be polyacrylamide-based such as partially hydrolysed polyacrylamide.

The composition may comprise 0.01-10 wt. % crosslinking agent based on the weight of the composition. The crosslinking agent may be an organic-based compound. The crosslinking agent may be ethylene glycol dimethacrylate. The crosslinking agent may be an ionic crosslinking agent. The crosslinking agent may be a metal salt. The metal salt may be a trivalent metal salt such as $Al_2(SO_4)_3$.

The composition may further comprise an expanding agent that is configured to expand the composition during crosslinking once the composition contacts the aqueous solution so as to form a polymeric sponge. The expanding agent may be a disocyanate capable of forming an expanded polyurethane-based foam.

The composition may be injected into a borehole using the system as set forth above.

Another aspect discloses a method of forming a polymeric material that stabilises a wall of a borehole, comprising: (i) injecting a composition comprising a polymer and a crosslinking agent into an aqueous solution located in an annulus formed between a drill located in the borehole and the wall borehole; and (ii) allowing the composition to gel to form a polymeric material having a Young Modulus in the range of about 0.01-5 GPa, a tensile strength in the range of about 1-100 MPa, and a breaking elongation in the range of about 100%-1000%.

The method may comprise injecting a booster into the borehole to allow the polymer and crosslinking agent to react to form the polymeric material in hard water. The booster may be injected after step (i). The booster may be agitated when injected into the borehole. The booster may be added as a ratio of about 5%-30% v/v based on a volume of the composition, such as about 10%-30%.

The method may further comprise injecting an expanding agent into the borehole so that the polymeric material forms a sponge. The expanding agent may be injected during step (i). The polymeric material may be formed about 10 seconds to 60 minutes, such as about 30-120 seconds, after step (i). The composition may be injected as an emulsion.

In an embodiment of the method, the composition may be as set forth above.

BRIEF DESCRIPTION OF THE DRAWINGS

Notwithstanding any other forms which may fall within the scope of the system, method and composition as set forth in the Summary, specific embodiments will now be described, by way of example only, with reference to the covering drawings in which:

FIG. 1a is a schematic representation of a first embodiment of the disclosed system for delivering a flowable substance to a remote location;

FIG. 1b is a plan view of the system shown FIG. 1a from section A-A;

FIG. 2 is a view of detail A shown in FIG. 1a;

FIG. 6 is an enlarged view of the system shown FIG. 5 highlighting the relative disposition of plugs and internal sealing surfaces incorporated in the system;

FIG. 7 is a view of detail a of FIG. 6 depicting a fluid flow path for fluid within a body of the system bypassing the plugs;

DETAILED DESCRIPTION OF SPECIFIC EMBODIMENTS

First Embodiment

Figure 3:
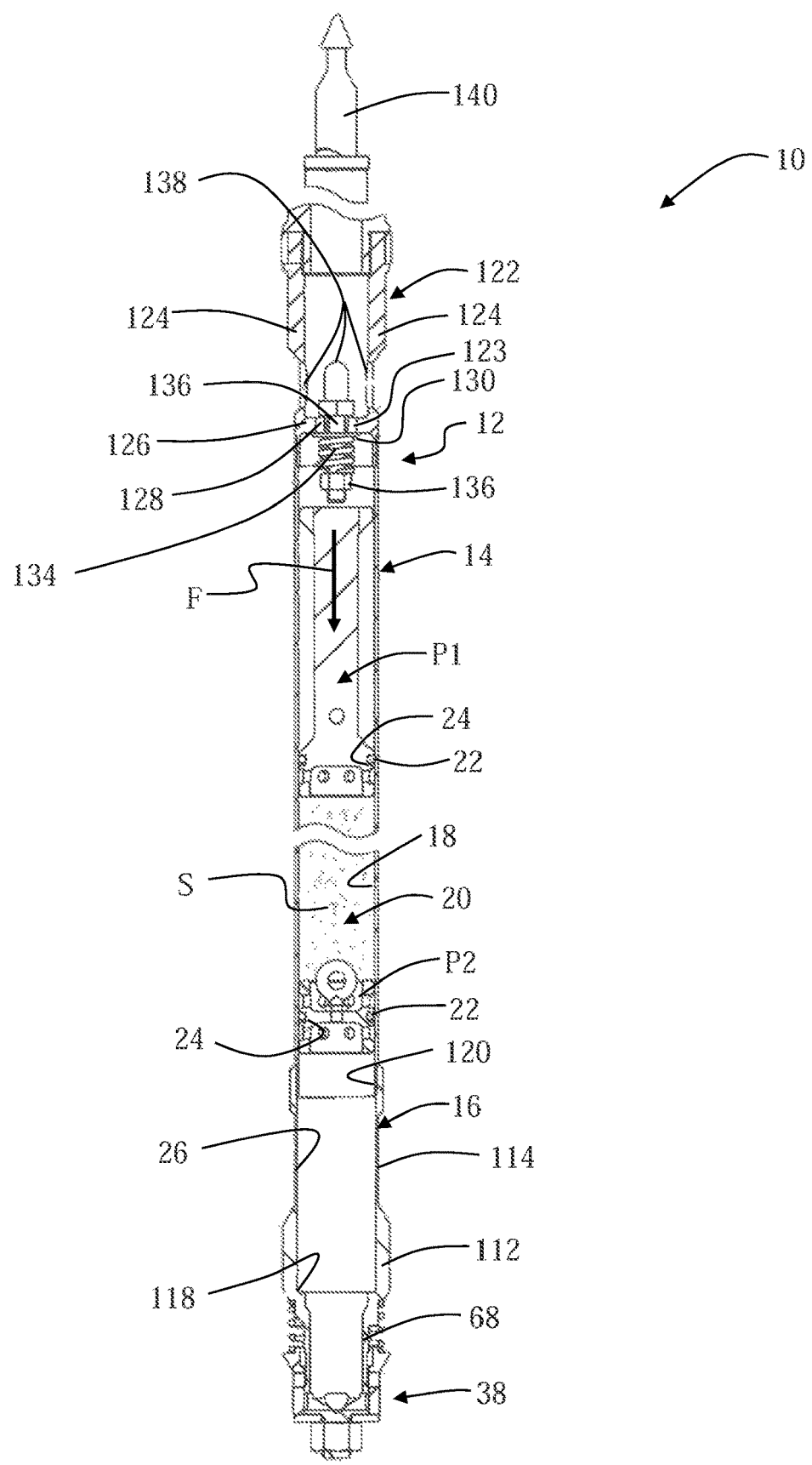
FIG. 3 illustrates the embodiment of the system shown in FIG. 1a when in a first configuration.
Figure 4:
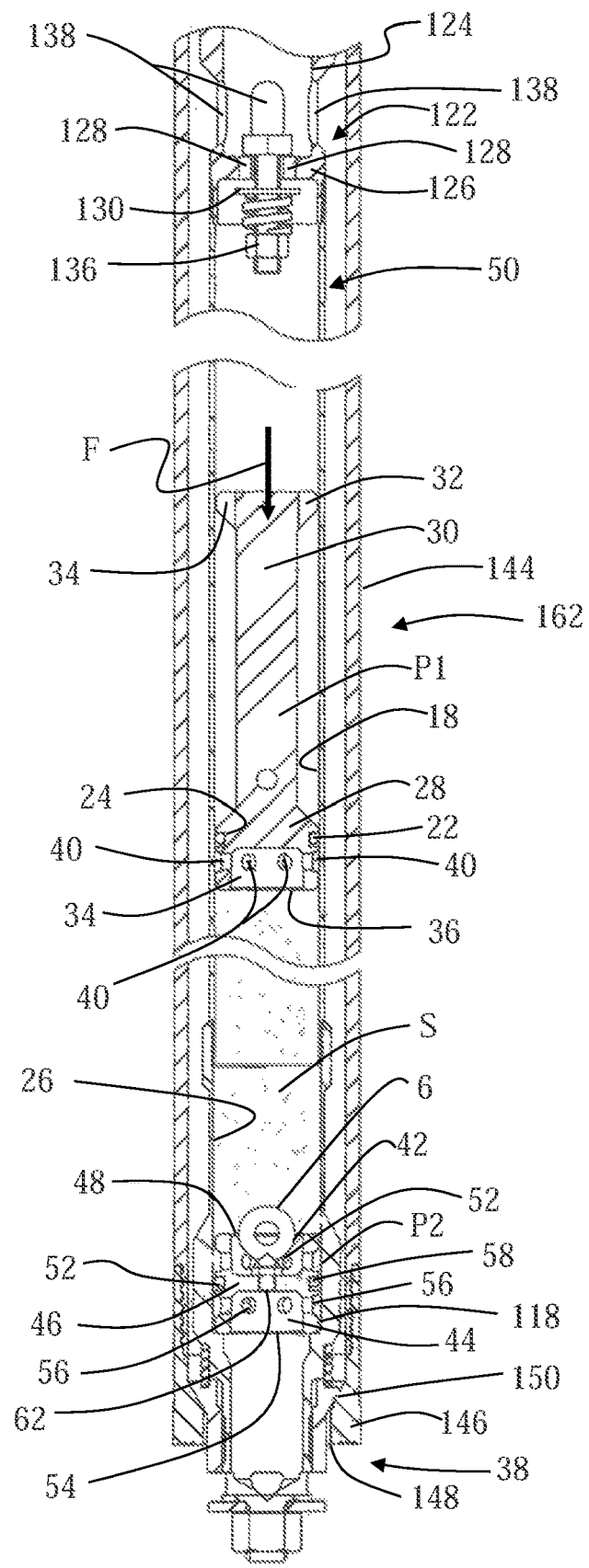
FIG. 4 illustrates the embodiment of the system shown in FIG. 1a when in a second configuration wherein a flowable substance can be dispensed by the system and further showing the system disposed within a conduit enabling the transport of the system to a location for dispensing the flowable substance.

With reference to the accompanying drawings, an embodiment of the delivery system 10 for a flowable substance S such as, but not limited to, grout comprises a body 12 having a first portion 14 and a second portion 16; and, a plurality of slidable plugs P1, P2 (hereinafter referred to in general as "plugs P"). Different embodiments of the delivery system 10 may have any number of slidable plugs P. In the embodiment shown FIGS. 3-11 an uppermost plug P1 is of a different configuration to the plug P2. However in other embodiments the plugs P may all have the same configuration.

Irrespective of their configuration each plug P is arranged to form a seal against an inner circumferential surface 18 of the first portion 14. Therefore respective sealed regions 20 can be formed within the portion 14 by spacing mutually adjacent plugs P. For any length of portion 14 the number of sealed regions 20 that can be formed is one less than the number of plugs P spaced apart within that length of portion 14. For example: two plugs P are required to create one sealed region 20, but with say four axially spaced plugs P three sealed regions 20 can be formed.

The plugs P and second portion 16 are also relatively arranged or configured so that when a plug P is in the second portion 16 a flowable substance can flow past or through that plug P.

The plugs P can be moved from the first region 14 to the second region 16 by applying a force F in an axial direction on the uppermost plug P1. The force F can be transmitted by the flowable substance S held within a sealed region 20 between axially adjacent plugs P.

Each plug P is formed with a sealing member 22 which bears against the inner circumferential surface 18 to form a seal there with. In the present embodiment the sealing member 22 is in the form of a resilient O-ring which is seated in a groove 24 of the plug P. However the second portion 16 is formed with an inner circumferential surface 26 dimensioned or otherwise configured so that the sealing member 22 is unable to contact the inner circumferential surface 26 in a manner to form a seal.

The plug P1 comprises a piston head 28 and an integrally formed trailing rod 30. The plug P1 may be viewed as a plunger. An end of the rod 30 distant the head 28 is formed with a flared tail 32 having an outer diameter substantially the same as the inner diameter of the first portion 14. The tail 32 is provided with a plurality of longitudinal cut-outs 33. The head 28 is formed with the circumferential groove 24 which seats the sealing member/O-ring 22. The head 28 also comprises a cup portion 34 having a mouth 36 that faces a first end 38 of the body 12, and a plurality of radially extending holes 40.

The plug P2 is formed with first and second cup portions 42 and 44 on opposite sides of a common wall 46. The cup portion 42 is on a side of the wall 44 and has a mouth 48 facing a second end 50 of the body 12. A plurality of radial holes 52 is formed in a circumferential wall of the cup portion 42.

The cup portion 44 is of identical configuration but of opposite orientation to the cup portion 42, having a mouth 54 facing the first end 38. A plurality of radial holes 56 is formed in a circumferential wall of the cup portion 44.

A bleed hole 58 is formed in the common wall 46 of the plug P2. The bleed hole 58 can be selectively closed by a demountable closure member 60. In the present embodiment the closure member 60 is in the form of an eyelet having a threaded shank 62.

When the sealing member 22 of any plug P is located within the second portion 16 a gap 64 (see FIG. 7) is created between the sealing member 22 and the inner circumferential surface 26. Therefore with reference to FIGS. 4 and 7 when the plug P2 is in the second portion 16, and pressure is applied upstream of the flowable substance S by the force F acting on the plug P1, the flowable substance S is able to flow through past the sealing member 22 through the gap 64 and subsequently through the holes 56 into the second cup portion 44 and out of the mouth 54. During this process the flowable substance S is also able to flow through the holes 52 out of the first cup portion 42 past the sealing member 22.

The body 12 has a valve 66 at a downhole end to control the dispensing of the flowable substance S from the body 12. The valve 66 has a closed state shown in FIGS. 1-3 and 11 preventing fluid flow into or out of the body 12. This includes preventing flow of the flowable substance S out from the body 12, and preventing flow of external fluid into the body 12. The valve for 66 also has an opened state shown in FIGS. 4-6, 8 and 9 allowing the flowable substance S to flow out of the body 12.

The valve 66 comprises a nozzle 68 which in this particular embodiment also forms an integral part of the second portion 16 of the body 12 and a collar 70 slidably mounted on the nozzle 68. The nozzle 68 is provided with a plurality of holes 72. A valve spring 74 acts to bias the collar 70 to a position where it covers the holes 72 thereby placing the valve 66 in a closed state. However when the collar 70 is slid along the nozzle 68 against the bias of the spring 74 it uncovers the holes 72 allowing fluid to flow out of the body 12.

With particular reference to FIGS. 1, 2 and 6 the collar 70 is formed with a frusto-conical portion 76 having an outer circumferential surface 78 that reduces in diameter in a direction away from the first portion 16. More particularly the outer circumferential surface 78 tapers so as to narrow in the downstream direction. A circumferential wall 80 is formed about the collar 70 integral with and inboard of a large diameter end of the frusto-conical portion 76. This creates a shoulder 81 for seating the spring 74. An up hole end of the collar 70 has an annular face 79.

Downstream of the frusto-conical portion 76 the collar 70 is provided with a cylindrical portion 82 having an axial end 83 distant the frusto-conical portion 76. A plurality of radial holes 84 is formed in the cylindrical portion 82 between the frusto-conical portion 76 and the axial end 83. The cylindrical portion 82 also has an inner circumferential wall 86 of constant diameter. When the valve 66 is in the closed position the circumferential wall 86 covers the holes 72 preventing flow of fluid into or out of the body 12.

An inner circumferential wall 88 of the frusto-conical portion 76 is rebated relative to, and therefore has a greater inner diameter than, the inner circumferential wall 86.

The collar 70 and the spring 74 are retained on the nozzle 68 by a washer 92 and nut 94. The nut 94 is screwed onto a threaded stud 96 which extends coaxially with and is formed integrally to the nozzle 68.

With particular reference to FIG. 2 it can be seen that the nozzle 68 is formed with an intermediate section 98 having a slightly reduced outer diameter in comparison to an upstream portion 100 of the nozzle 68, and a downstream portion 102 in which the holes 72 are formed. The intermediate portion 98 is formed with a circumferential band 104 having an outer surface of constant diameter, and an upstream faceted portion 106. The faceted portion 106 is formed with a plurality of circumferentially spaced flat surfaces 108.

When the valve 66 is in the closed position as shown in FIGS. 1 and 2 the collar 70 is biased by the spring 74 against the washer 92. The inner circumferential surface 86 of the cylindrical wall 80 covers the opening 72 preventing flow of fluid into or out of the body 12. The holes 84 and the inner circumferential surface 88 of the collar 70 are radially adjacent the circumferential band 104 and the faceted portion 106 respectively. The relative dimensions and configuration of the intermediate portion 98 and the collar 70 forms an annular gap and a corresponding flow path 110 through which fluid can flow from beneath the body 12 past the body 12.

The exterior of the body 12 is formed with a centraliser 112 and a coaxial tubular portion 114. A downstream end of the centraliser 112 is adjacent to the valve 66 and nozzle 68. The tubular portion 114 extends upstream of the centraliser 112. FIG. 1a shows a plan view of the body 12 long section A-A depicted in FIG. 1. The tubular portion 114 has an outer radius R1 while the centraliser 112 has an outer surface that fits within a circle of radius R2>R1. Further, the outer radius R2 of the centraliser 112 is smaller than an inner radius R3 of a delivery conduit 144 through which the body 12 travels.

The centraliser 112 is formed with a plurality of recessed surface portions 116 that lie within the radius R2 to create channels 109 within the delivery conduit 144 through which fluid in the conduit 144 can flow as the body 12 travels to the delivery location.

The surface portions 116 can be flat as shown in the accompanying drawings although other configurations such as accurate and in particular concavely curved surfaces are possible.

The maximum outer radius of the collar 70 is substantially the same as the maximum radius R2 of the centraliser 112. A boss 113 is formed on body 12 below the centralizer 112 which seats the spring 74. The portion 100 of the nozzle 68 adjacent the boss 113 has a smaller outer diameter thereby forming a circumferential shoulder 115 with an annular face 117 on the body 12.

In the presently depicted embodiment the centraliser 112 is formed on the second portion 16 of the body 12. However it may equally be formed on the first portion 14 of the body 12. In any event the radius R1 is outer radius of both the tubular portion 114 and the portion 14. If desired more than one centraliser 112 may be provided and they may be arranged for example one near a lower end of the body 12 (for example of downhole end of the portion 16) with another located intermediate the length of the portion 14.

With reference to FIG. 3 it will also be seen that the second portion 16 has an internal shoulder 118 near the upstream end of the nozzle 68. An upstream end of the second portion 16 is formed with an internal screw thread 120 to facilitate screw coupling to the first portion 14.

The system 10 includes a fluid pressure activated one-way valve 122 at an upstream end of the first portion 12, i.e. at an end distant the second portion 16. The one way valve 122 has a tubular body 124 that is screwed onto the body 12. A wall 126 extends radially within, and inboard of the ends of, the body 122. A number of channels 128 are formed in the wall 126. A sealing washer 130 is biased against the channels 128 on a side of the wall 126 internal of the body 12. The bias is provided by a spring 134 disposed about a bolt 134 which passes through the wall 126 and is retained by a nut 136. The spring 134 is pre-loaded to bias the washer 130 onto the wall 126 closing the channels 128. The valve 122 is also provided with a plurality of ports 138 formed in the tubular body 124 upstream of the wall 126. Fluid pressure within the body 12 would ordinarily act to further bias or push the washer 130 against the channels 128 thereby preventing a flow of fluid from the body 12 through the channels 128. However the one way valve 122 will open when fluid pressure acting above the wall 130 is greater than the combined pressure exerted on the washer 130 by fluid pressure within the body 14 and the spring 134.

A spear point 140 is connected to an upstream end of the one way valve 122. The spear point 140 is also provided with a body having a plurality of ports 141 (shown in FIG. 1*a*). The spear point 140 enables connection of the system 10 to an overshot and wire line (not shown). This in turn enables a system 10 to be delivered down and retrieved from a conduit such as a drill string.

The system 10 incorporates a transport mechanism to transport the body 12 and contained flowable substance S to a remote location. In the presently described embodiments the transport mechanism comprises a conduit which may for example be in the form of a ground drill 142 (FIGS. 4-6 and 12). The drill 142 comprises a drill string 144 having a drill bit 146 coupled to its downhole end. The drill bit 146 in this instance is a core drill bit and accordingly has a central opening 148. An inner circumferential surface 150 of the drill bit 146 is tapered in a manner complimentary to the frusto-conical portion 78 of the collar 70. The drill bit 146 acts as a stop mechanism preventing the system 10 from falling out of the conduit (i.e. the drill string 144). In particular the collar 70 is able to pass through the drill bit 146. However when fluid pressure is applied from above the system 10 body 12 is able to move a short distance in the downhole direction compressing the spring 74 thereby opening the valve 66.

The operation of the system 10 will now be described in the context of delivering a floatable substance S such as grout to a location within a borehole being drilled by a ground drill 142.

The first portion 14 of the body 12 is disconnected from both the second portion 16 and the one way valve 122 and thus constitutes a simple tube. The plug P1 is inserted into an end of the first portion 14 which in the assembled system 10 is adjacent the one-way valve 122. The plug P1 is inserted a distance so that the sealing member 22 in contact with the inner circumferential surface 18 and the tail 32 is inside of the end through to the plug P1 is inserted.

The flowable substance S is poured into the first portion 14 from the opposite end. Next the plug P2 is inserted from the same end with the eyelet 60 facing the plug P1. The plug P2 is pushed into the first portion 16 so that at least the sealing member 22 is in engagement with the circumferential wall 18. Assuming the flowable substance S is an incompressible liquid, gel or paste this will also cause the plug the one to move the same distance back up the first portion 14. Accordingly the plug P1 is initially inserted a distance into the first portion 14 sufficient to ensure that the tail 32 remains within the confines of the first portion 14 to provide clearance for the components of the one way valve 122 after the plug 20 is pushed back.

With the flowable substance S is now held in the sealed region 20 between the plugs P1 and P2, the one-way valve 122 can now be connected to first portion 14 at an end adjacent the plug P1 while the second portion 16 is connected to the opposite end of the first portion 14. The plugs P1 and P2 both being within the first portion 16 with the flowable substance S held in the sealed region 20 represents a first configuration of the plugs P. The valve 66 is closed by virtue of the spring 74 biasing the collar 70 against the washer 92. Therefore no fluid can enter or exit the body 12 through the holes 72 in the nozzle 68. However the flow path 110 is open.

The drill 142 is located within a borehole with the drill bit 146 positioned near a portion of the borehole into which it is desired to inject the flowable substance S. System 10 is connected to an overshot via the spear point 140 and lowered through the drill string 144 toward the bit 146. The centraliser 112 assists in an axially aligning the system 10 and more particularly the valve 66 within the drill string 144. This assists in ensuring that the nozzle 68 passes through the opening 148 and the collar 70 neatly seats on the inner circumferential surface 150 of the drill bit 146.

In the event that there is a liquid (for example water or mud) in the borehole then the system 10 must sink through that liquid in order to reach the drill bit 146. The rate at which the body 12 is able to descend through the liquid is dependent on the maximum transverse footprint area of the body 12. This determines the maximum clearance between the body 12 and the interior of the drill string 144 through which the liquid can pass the body 12. As the centraliser 112 it is profiled with a plurality of flat surfaces 116 but the collar, about the maximum diameter of the frusto-conical 76, is of constant radius substantially equal to the radius R2, it is the configuration of the collar 70 that dictates the maximum descent rate. As discussed above, during the descent while the valve 66 is closed the flow path 110 is open. This creates a first bypass flow path for the liquid (in addition to the annular space that exists between the outer surface of the collar 70 and the inner surface of the drill string 144) which in effect reduces the transverse footprint area of the body 12 presented to the column of liquid. The rate of descent is further assisted by a second bypass flow path created between the flat surfaces 116 of the centraliser 112 and the inner circumferential surface of the drill string 144.

Eventually, irrespective of the existence of liquid within the borehole, the collar 70 will engage the seat 150. The weight of the system 10 may in itself be sufficient to cause the body 12 to move relative to the collar 70 against the bias of spring 74 to move the valve 50 to the opened state shown for example in FIG. 4 where the holes 72 are uncovered from the collar 70. Nevertheless, the flowable substance S within the region 20 cannot escape through the holes 72 at this time as the plug P2 is still in its initial configuration shown in FIG. 3 where it's sealing member 22 forms a seal against the inner surface 18. This configuration also prevents accidental contamination of the sealed substance by the in-hole drilling fluid that may be caused by increased external pressure from the fluid present in the borehole at great depth.

It should also be noted that when the valve 66 is in the opened state the bypass flow path 110 becomes shut. The closing of the bypass flow path 110 is achieved by two separate mechanisms. Either one is sufficient in itself to close or shut the bypass flow path 110. Accordingly in different embodiments only one of these need be present to close the bypass flow path 110.

Figure 8:
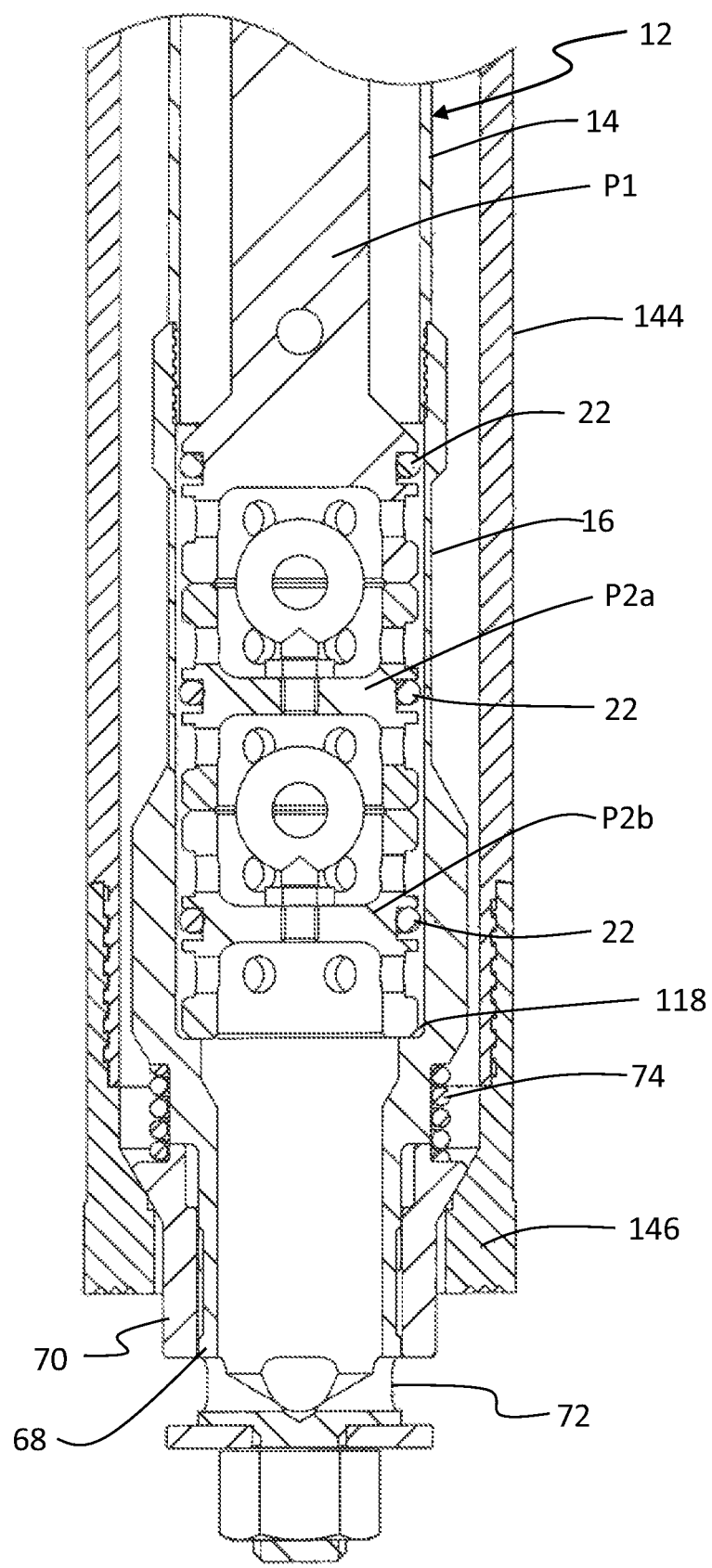
FIG. 8 is a section view of a bottom end of the second embodiment of the system which incorporates a plurality of sealed regions for holding one or more flowable substances.

A first closing mechanism is the collar 70 moving in an up hole direction relative to the nozzle 68 so that the inner circumferential surface 86 of the collar 70 now overlies the upstream portion 100 of the nozzle 68 which has a greater outer diameter than the circumferential band 104, (for example see FIG. 8). The outer diameter of the portion 100 is marginally smaller than the inner diameter of the portion 86 providing a close fit and thereby substantially sealing the openings 84.

A second closing mechanism is the combination of the upper annular face 79 of the collar 70 and the shoulder 115. When the valve 66 is closed the annular face 79 contacts the annular face 117 of the shoulder 115 thereby closing the bypass flow path 110.

The valve 66 may be thus be considered to be a dual acting valve, in particular a (a) flowable substance valve which controls the flow of the flowable substance S out of the body 12; and (b) a bypass flow path valve acting to open or close the bypass flow path 110. When the body 12 is travelling through the conduit/string 144 the valve 66 is in the condition shown in FIGS. 1a and 2 where the flow path for the flowable substance S is closed due to collar 70 covering the holes 72, while the bypass flow path 110 is opened, (i.e. the flowable substance valve is closed but the bypass flow control valve is open). After the body 12 has landed on the stop mechanism/drill bit 146 and fluid pressure is applied to slide the body 12/nozzle 68 relative to the collar 70 the flow path for the flowable substance S is opened by the uncovering the holes 72 while the bypass flow path 110 is closed by the outer circumferential surface 100 now overlapping the inner surface 86 and the annular faces 79 and 115 contacting each other, (i.e. the flowable substance valve is open but the bypass flow control valve is closed).

In order to now inject the substance S into the borehole a fluid such as water is pumped through the drill string 144. The water is unable to flow through the opening 148 due to the sealing effect of the frusto-conical surface 76 against the inner circumferential surface 150 of the drill bit 146. The water will however flow through the ports 138 and 141 and exert pressure through the channels 128 onto the washer 130.

When the water pressure exceeds the bias of the spring 132, the washer 130 moves away from the channels 128 opening the one way valve 122. The water can now flow into the first portion 14 and act on the plug P1.

The pressure of the water produces a force F on the plug P1 causing it to move in a direction toward end 38 of the body 12. This force is transmitted through the flowable substance S causing it and the piston P2 to advance or slide in a direction toward the end 38.

Continued application of the force F will result in the plug P2 entering the second portion 16 and eventually stopping on the shoulder 118 as shown for example in FIGS. 4-7. When the plug P2 is in the second portion 16 the gap 64 is created between the sealing member 22 and the inner circumferential surface 26. This breaks the sealed previously maintained while the plug P2 was in the first portion 14. The plug P2 being in the second portion 16 constitutes a second configuration of the plugs P.

As the water pressure continues to act on the P1, the piston continues to move toward the plug P2 but at this time remains within the first portion 14 and therefore creates a seal against the surface 18. Therefore the flowable substance S is now forced to flow through the gap 64, past the sealing member 22 and the plug P1, through the holes 56 and out of the mouth 54 into the nozzle 68.

The valve 66 may be closed at this time preventing the passage of the flowable substance S out of the holes 72. In that event the continued application of water pressure will result in the nozzle 68 being moved in a downhole direction relative to the collar 70 against the bias of the spring 74. This slides the collar 70 relative to the nozzle 68 to uncover the holes 72 while also closing the bypass flow path 110. The flowable substance S may now be injected into the borehole through the holes 72. To assist in the application of the flowable substance S and/or create a mixing effect the drill string 114 can be rotated while the substance S is being injected into the borehole.

Figure 5:
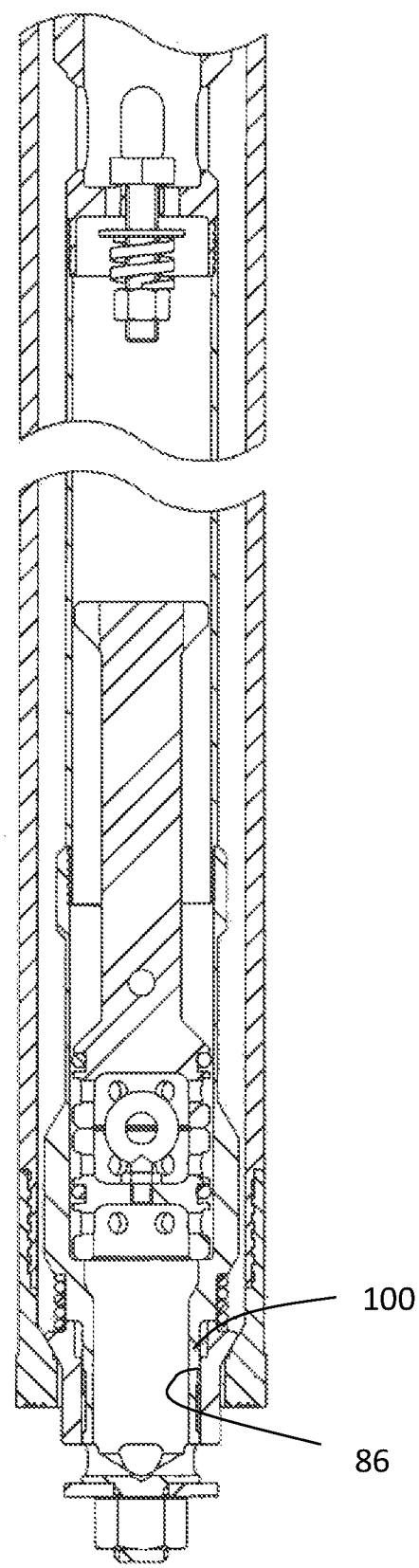
FIG. 5 illustrates the embodiment of the system shown in FIG. 1a when in a third configuration in which all the flowable substance has been dispensed.

The continued application of water pressure will eventually result in the plug P1 entering the second portion 16 and abutting the plug P2 as shown in FIGS. 5-7.

When the sealing member 22 of the plug P1 enters the second portion 16 is unable to form a seal with the inner circumferential surface 26 so that a further fluid bypass gap 64 is created. This can be detected as a drop in fluid pressure at the surface indicating that all of the flowable substance S has now been injected into the borehole. The combined gaps 64 form a flushing fluid flow path 152 shown most clearly in FIGS. 6 and 7 in which water (or other fluid) injected into the borehole or the drill string 144 now flow through the body 12, and nozzle 68 into the borehole. The drop in fluid pressure may be used, depending on the nature of the substance S injected into the borehole, as a sign to shut off the water supply so as to minimise the risk of diluting or washing away the substance S. Having both the plugs P1 and P2 abutting or otherwise in close proximity to each other constitutes a third configuration of the plugs P. This configuration is indicative of at least the flowable substance S previously between the plugs P1 and P2 now being substantially ejected from the system 10.

The system 10 may now be retrieved by an overshot on a wireline engaging with the spear point 140. The one way valve 122 and the second portion 16 can now be decoupled from the first portion 14. Plug P1 can be extracted from the second portion 16 by simply pulling up on the rods 30. The plug P2 can be withdrawn from the second portion 16 by using a hook to engage the closure member/eyelet 60. Portion 14 can be rinsed out or otherwise cleaned and now refilled in the manner described hereinabove with flowable substance S for reuse.

Second Embodiment (Plugs P2 at both ends of first portion 14) As mentioned above, while the embodiment depicted in FIGS. 1-10 shows two different configurations of plugs P1 and P2, in a second embodiment all of the plugs may have a configuration of the plug P2. This allows the bleeding of air from within the tube constituting the first portion 14 when filling with the flowable substance S.

For example, consider the arrangement in FIG. 3. In order to initially fill the first portion 14 a first plug P2 is inserted in the lower end of the first portion 14 with the closure member/eyelet 60 screwed into the wall 46 and facing the inside of the portion 14. Next the flowable substance S is poured in from the opposite end of the portion 14.

Now a second plug P2 with the closure member/eyelet 60 removed is inserted into the top end of the portion 14 and pushed down to contact the flowable substance S. Any air existing between the substance S and the newly inserted plug P2 is able to escape through the bleed hole 58. The closure member/eyelet 60 can now be reinserted into the bleed hole 58. During this process the initially inserted plug P2 can be prevented from being pushed out of the portion 14 either by holding the bottom end of the portion 14 against a hard surface or simply screwing a removable cap onto the adjacent end of the portion 14.

Figure 11:
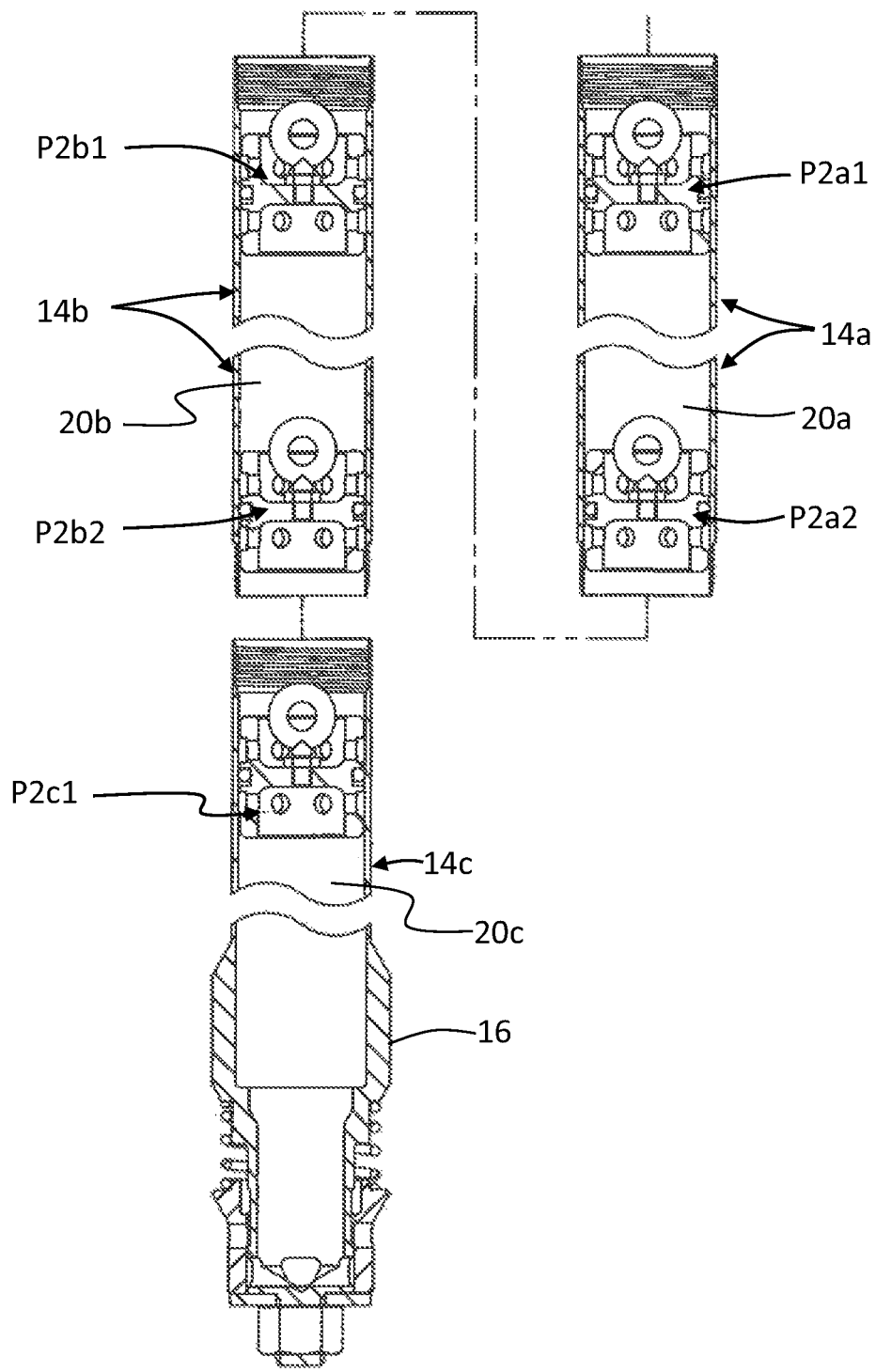
FIG. 11 is a schematic representation of a fourth embodiment of the system for delivering a flowable substance.

While FIG. 11 is intended to depict a different embodiment, the currently described arrangement of plugs P2 is shown in uppermost first portion 14a of the system shown in FIG. 11. The uppermost first portion 14a, which may for example be in the form of a 3 m length of pipe is sealed at opposite ends by respective plugs P2.

Third Embodiment (Selective Control of Flushing Fluid Flow Path 152)

FIGS. 8-11 depict how an alternate embodiment of the system 10 can be arranged to selectively shut off, or more precisely prevent the creation of, the flushing fluid flow path 152 (shown in FIGS. 6 and 7). The flushing fluid flow path 152 can be selectively controlled by manipulating the number of plugs P and/or the axial length of at least one of the plugs P and/or the length of the second portion 16 so that when all of the plugs P are in the third configurations (i.e. in mutual abutting contact or very close proximity) at least one of the plugs P still resides within the first portion 14.

FIG. 8 shows an arrangement of the system 10 which incorporates three plugs P, namely plugs P1, P2a and P2b when in the third configuration with all of the plugs abutting or in close proximity to each other and the flowable substance S being substantially ejected from the body 12. The plug P1 is of the same configuration as described above in relation to the other embodiments. Similarly the plugs P2a and P2b are of the same configuration as a plug P2 described above. The plugs P1 and P2a are stacked on each other and the base plug P2b. It will be noted however that the sealing member 20 to the plug P1 is still within the second portion 16 and that therefore the flushing fluid path 152 is formed and allows fluid to pass through the body 12 and nozzle 68 into the borehole.

Figures 9, 10:
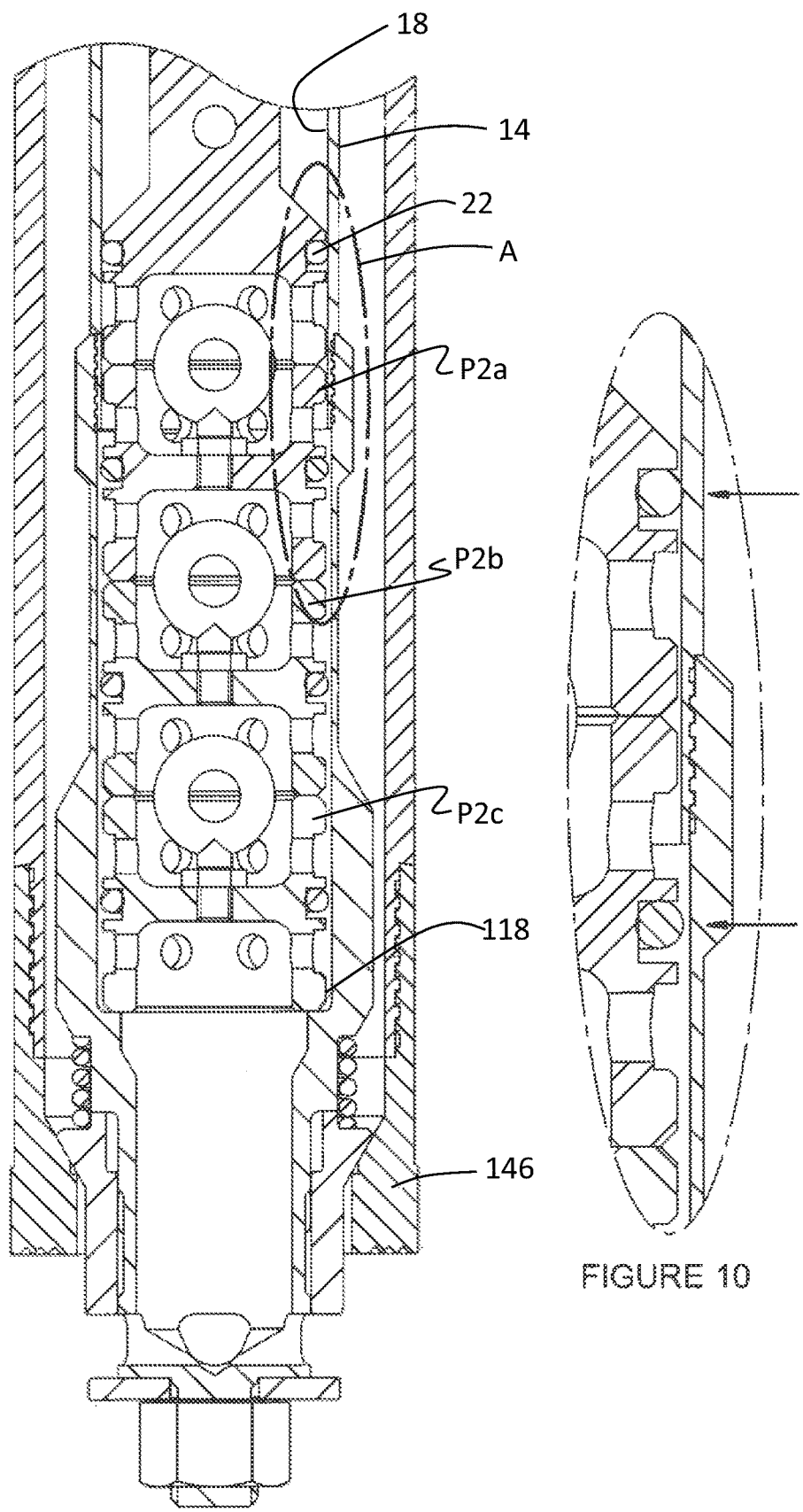
FIG. 9 is a section view of a bottom end of a third embodiment of the system which is arranged to prevent the formation of the fluid flow path shown in the embodiment of the system depicted in FIG. 6.
FIG. 10 is a view of detail A of FIG. 9.

However by adding one further plug P2c as shown in FIGS. 9 and 10 the uppermost plug P1, when the plugs P are in the third configuration, now resides within the first portion 14. The plug P1 cannot move further in the downhole direction because the stack of plugs P is hard up against the shoulder 118. Therefore irrespective of the fluid pressure applied to the distance P within the body 14 the seal against the inner surface 18 created by the selling member 22 a plug P1 remains. Accordingly in this embodiment the flushing fluid flow path 152 is not and cannot be formed.

This has application in instances where it is desirable to ensure that the fluid that activates the system 10 to push the flowable substance S into the borehole cannot then subsequently flow into the borehole and dilute or flush away the substance S.

In this embodiment the additional plugs P2a, P2b, P2c can be inserted into the lower end of the first portion 14 shown in FIG. 3.

Fourth Embodiment (Multiple Sealed Regions 20)

FIG. 11 depict a further embodiment of the system 10 which comprises multiple sealed regions 20a, 20b and 20c (hereinafter referred to in general as "sealed regions 20"). This embodiment would be used for example when large volumes of flowable substance S are required, or where perhaps a multi-part flowable substance S is used where the different parts are required to be physically separated from each other until being mixed in the borehole.

FIG. 11 depicts the system 10 having first, second and third first portions 14a, 14b and 14c. A sealed region 20a is formed in the first portion 14a between plugs P2a1 and P2a2. A separate sealed region 20b is formed in the second first portion 14b between plugs P2b1 and P2b2. Another sealed region 20c is formed in the third first portion 14c below plug P2c1, however only the upper part of the portion 14c is depicted in FIG. 11.

The three portions 14a, 14b and 14c are assembled together end to end with the second portion 16 being coupled to the lower/downhole end of the portion 14c, and the one-way valve 122 being coupled to the upper/up hole end of the portion 14a. The assembled system 10 can then be used in the same manner as described above in relation to the earlier embodiments. When used the flowable substance in the region 20c will be first injected into the hole then followed by the flowable substance in the regions 20b and 20a. The provision or otherwise of the flushing fluid flow path 152 can be designed into the system 10 by appropriate dimensioning of the second portion 16 and/or incorporation of additional plugs P so that as desired, when all the plugs P are in the third configuration, an upper most of the plugs P is disposed so that it's sealing member 22 is in (a) the portion 14a (i.e. no flushing fluid path); or (b) the second portion 16, in which event the flushing fluid flow path 152 is formed.

It will be appreciated that any number of portions 14 can be connected together to provide any volume of flowable substance required to be injected. Conveniently each portion 14 may comprise a length of standard core inner tube.

Figure 12:
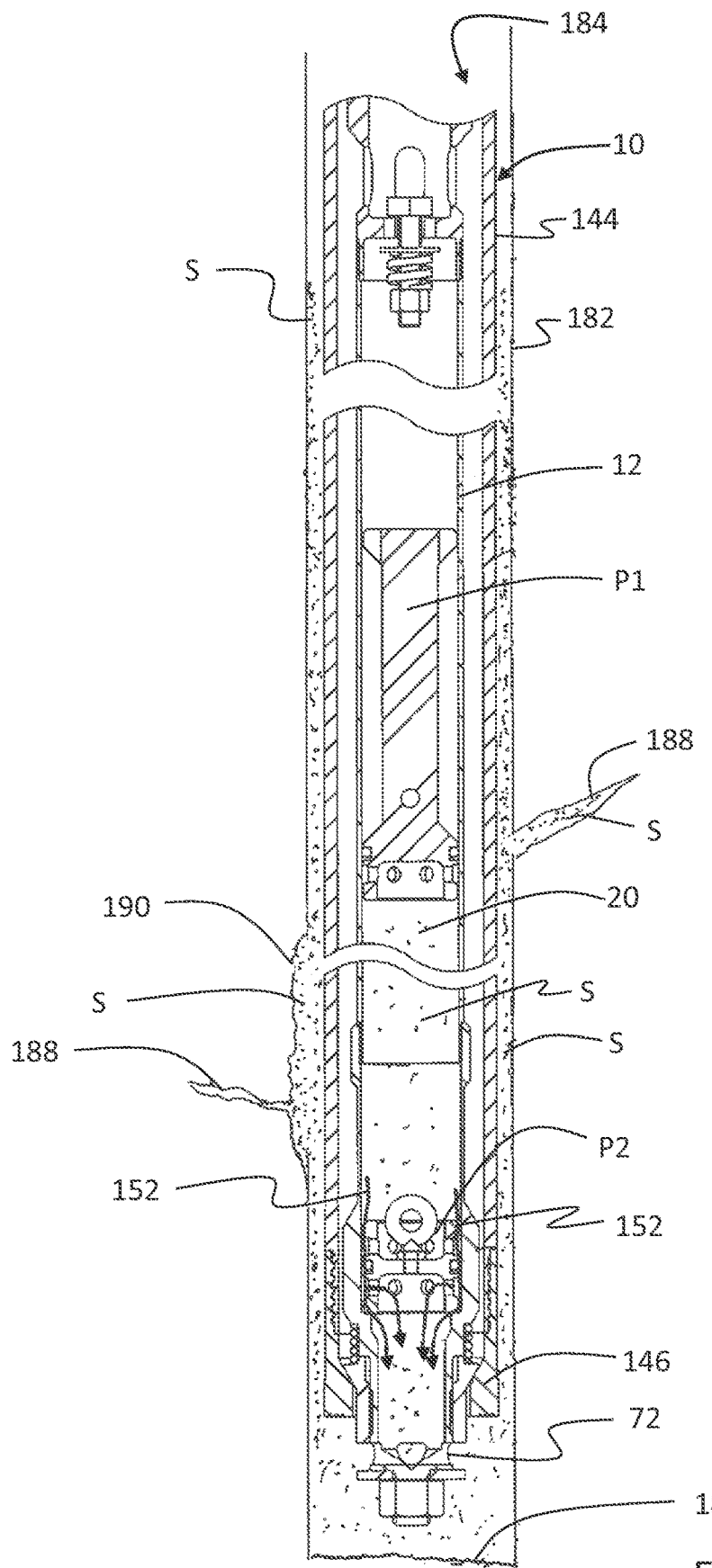
FIG. 12 is a schematic representation of the use of an embodiment of the system for delivering a flowable substance for the purposes of forming a seal on a borehole wall.

FIG. 12 provides a schematic representation of the use of an embodiment of the system 10 to form a substantial seal 180 on a wall 182 of the borehole 184 created by the operation of the drill 142. Here the system 10 delivers a flowable substance S in the form of an injectable hydro-activated, flexible borehole sealant with lubricating qualities in the sealed region 20 of the body 12 through the drill string 144 to a location near a toe 186 of the borehole 184. The substance S can be formulated to activate in a wide variety of borehole pH, temperature and salinity conditions.

Traditionally water loss, swelling or caving borehole ground conditions have been treated with a combination of building up a clay filter cake on the interior of the borehole wall and/or lost circulation material such as cellulose fibre or hydro-activated polymers to plug leaks. Another method is to use cement or hydro/chemical activated polymer grouts to glue and seal broken rock strata together or seal off hygroscopic and swelling ground formations. If these fail then drill operators often resort to drill advance steel casing in the borehole past the problem zone or zones and then continue core drilling through and past the steel cased zone with a smaller diameter drill string. This is very costly, time consuming and can only be repeated once or twice in one borehole before the borehole/drill string size reduction becomes too small to be practicable and the borehole must then be abandoned. As well the steel casing may not be recovered after the borehole has been completed as it will often become stuck by the unconsolidated ground conditions.

It is believed that a very high strength cross linked and broad spectrum hydro activated polymer can overcome these problems. This can be injected into a borehole and squeezed up the annulus of the borehole between the borehole wall and the drill pipe using the system 10 at regular intervals to create a rapid setting, broad spectrum, plasticized and self-lubricating, water tight annual borehole membrane that will not bond to or bind the active drill string in the borehole and may also reduce the actual in-hole torque, increasing the drill bit penetration rate and improving overall productivity.

In the hard rock mineral and civil drilling industries the annulus is narrow having an outer diameter that is generally only marginally greater than the diameter of the drill bit, with the inner diameter being the outer diameter of the drill string to which the drill bit is attached that in turn is generally marginally smaller than the bit diameter. In any event the outer diameter of the annulus at the very most would be less than 1.2× drill string diameter; and more likely less than 1.1 or indeed about or less than 1.05× drill string outer diameter. In comparison in the Oil and Gas industry the annulus can be significantly greater than 1.2× the outer diameter of the drill string.

The isolation of the hydro-activated polymer product within the water and pressure sealed region 20 of the rapid descent body 12, allows the product to travel to any depth of borehole over almost any time period without prematurely chemically setting off.

Then the pressurized injection process once the body has seated on the inner surface of the drill bit 146 at the bottom of the drill string 144, allows the product to be effectively and efficiently sheared, and mixed with the native ground water and/or drilling fluid in the bottom of the borehole 182, allowing it to chemically react.

The further mechanical action of the rotating drill string 144 combined with the pressurized water flow provided by the on-board drill rig water pump and passing through the flow path 152, squeezes and trowels the substance S into the borehole wall 182 within the narrow annulus between the drill string 144 and the borehole wall 182, while it is still chemically setting off. This facilitates the development of a water proof hygroscopic, slick and plasticized casing membrane between the drill string and the native rock strata. This is squeezed into natural fissures 188, cracks and voids 190 within the rock strata, binding loose rock material together and creating a water barrier between the borehole drilling fluid and any natural hygroscopic rock/soil strata formations that would otherwise swell when exposed to drilling fluid or ground water and cause excessive in-hole torque or even may cause the drill rods to become bogged in the borehole 184.

The creation of a plasticised hygroscopic and waterproof barrier membrane between the natural borehole wall and the drill string effectively creates a controlled annular environment preventing or minimising the natural groundwater and other environmental contaminates from diluting or changing the chemical composition of the drill rig drilling fluid. This is of significant benefit as it effectively allows the drill crew to create and control the down-hole drilling environment, minimising the number and types of drilling fluid chemicals required to complete a borehole as well as minimising the potential environmental impact of injecting chemical drilling fluids into the rock strata and environmental ground water system.

Another feature of this product is its self-lubricating quality, that when mechanically trowelled into the strata of the borehole wall by the combined action of the system 10 and the rotating drill string 144, prevents it from binding with or bogging the drill string in the borehole. This product also significantly reduces the in-hole torque created by the friction of a rotating and/or bending drill string within a borehole, thus improving drill bit penetration rate and overall drill rig productivity.

In an embodiment, the flowable substance S is a composition for use in forming a polymeric material, such as a crosslinked polymer network, that stabilises a wall of a borehole. The composition may form the hydro-activated polymer. The composition comprises a polymer and a cross-linking agent. The composition is injectable into an annulus formed between a drill located in the borehole and the wall. When exposed to an aqueous solution located in the annulus, the composition forms a polymeric material having a Young Modulus in the range of about 0.01-5 GPa, a tensile strength in the range of about 1-100 MPa, and a breaking elongation in the range of about 100%-1000%.

The aqueous solution is generally borehole water and may include mud. However, non-aqueous fluids may be present in the borehole water, such as oils and lubricating fluids used core drilling situations. The composition may be used to stabilize boreholes generated during the use of a drill rig. Therefore, the composition may be used during use of a drill rig.

The Young Modulus may be about 0.01, 0.05, 0.1, 0.5, 1.0, 1.5, 2.0, 2.5, 3.0, 3.5, 4.0, 4.5 or 5 GPa. The Young Modulus may be about 0.01-1.0, 1.0-3.0 or 3.0-5.0 GPa. The tensile strength may be about 1, 2, 5, 10, 15, 20, 25, 30 35, 40, 45, 50, 55, 60, 65, 70, 75, 80, 85, 90, 95 or 100 MPa. The tensile strength may be about 1-20, 20-50, 50-80 or 80-100 MPa. The breaking elongation may be about 100%, 150%, 200%, 250%, 300%, 350%, 400%, 450%, 500%, 550%, 600%, 650%, 700%, 750%, 800%, 850%, 900%, 950% or 1000%. The breaking elongation may be about 100%-250%, 250%-500%, 500%-750% or 750%-1000%. The specific mechanical properties of the polymeric material can be dependent on the strata to be stabilized. For example, the mechanical properties of the polymeric material may be selected to be higher or lower than the mechanical properties of the strata.

In an embodiment, the composition is an emulsion formed from an oil and a solution of the polymer. Alternatively, the polymer may be suspended as particles in the oil. The composition may comprises about 10-60 wt. % polymer relative to the weight of the composition. For example, if the composition is in the form of an emulsion, there may be between about 10-60 wt. % of polymer relative to the weight of the emulsion. In some embodiment, the composition comprises polymer in a range of about 15-55 wt. %, 20-55 wt. %, 25-55 wt. %, 25-50 wt. %, 25-45 wt. %, 25-40 wt. % or 25-35 wt. %. The composition may comprises about 10, 20, 30, 40, 50 or 60 wt. % polymer. The strata in which the borehole is formed and the natural and mechanical fractures in the wall of the borehole can determine the concentration of the polymer in the composition to adjust, for example, the viscosity of the composition when an emulsion is used.

The crosslinking agent can be suspended in the emulsion. For example, the crosslinking agent can be insoluble in the oil of the emulsion, i.e. be suspended in the oil, but be soluble in the borehole water. When an emulsion is used, the crosslinker may preferentially partition in the oil phase over the aqueous phase. If the polymer partitions into the aqueous phase of the emulsion, then the polymer and the crosslinking agent can only react with one another to form a crosslinked polymer network, i.e. the polymeric material, once the crosslinking agent and polymer solubilise in the borehole water. Therefore, the rate of solubilisation of the polymer and the crosslinking agent can determine that rate at which the polymeric material forms i.e. the gelling time of the composition. For example, if the crosslinking agent is present as a particulate such as a suspended powder located in the oil phase of an emulsion, it will only begin to react with the polymer once the particulates begin to dissolve in the aqueous solution.

The polymer and the crosslinker should ideally react at a similar rate so that one of the polymer or the crosslinker does not preferentially diffuse into the aqueous solution to form a weak gel, such as an uncrosslinked gel. Weak gels are unfavourable as they tend to produce a colloid with a consistency that has a low plastic deformation range, which means they tend to stick to drill string 144 which increases friction between the borehole and the drill string 144. In addition, weak gels tend to form a poor membrane on a wall of the borehole so issues of water loss, swelling or caving of the borehole walls may persist. Weak gels will also tend to break down due to the mechanical stresses and forces applied to the gel during e.g. pipe rotation and mud pumping processes. This breakdown makes weak gels susceptible to e.g. ingress and egress of fluid to the borehole and failing to provide sufficient mechanical strength to support the natural and mechanical fractures. Since the polymeric material is crosslinked, it is able to withstand these forces and stresses so as to provide a material that can stabiles the wall of the borehole for a longer period of time. In some cases, the polymeric material can have a lifetime that is the same as the lifetime of the borehole.

The gel time, that is the time required to start forming the polymeric material, may be in a range of about 10 seconds to 60 minutes after the composition has contacted the borehole water, such as about 10, 15, 20, 30, 40, 50, 60, 70, 80, 90, 100, 120 seconds, or 3, 4, 5, 6, 7, 8, 9, 10, 15, 20, 25, 30, 35, 40, 45, 50, 55 or 60 minutes. This time allows the composition to squeeze and trowel around the drill string 144 and into natural and mechanical fractures in the wall of the borehole before the polymeric material has formed. In some embodiments, the gel time may be 10-30 seconds after contact with the borehole water i.e. after injection into the borehole. In other embodiments, the gel time may be greater than 120 seconds, such as 120-300 seconds after contact with the borehole water. The gelling time may be several minutes to an hour. The borehole conditions may determine the required gel time, for example the severity of the natural or mechanical fractures.

Generally, the composition will contact the borehole water at the time of injection into borehole. The delay between injection and gelling allows the composition to squeeze and trowel around the drill string 144 and into natural and mechanical fractures in the wall of the borehole. The faster the polymeric material forms the less time the borehole is offline to address issues of e.g. water loss, swelling and caving of the borehole. However, this needs to be weighed against the gelling time. Therefore, the gelling time is a balance between the operational requirements of the drill string associated with the borehole, and the mechanical requirements of the polymeric material.

The term "polymeric network" is to be understood in its broadest form to include a crosslinked polymer network having any number of polymer chains crosslinked with any number of crosslinking agents. For example, the polymeric network can be only slightly crosslinked or highly crosslinked. Not all polymer chains may be incorporated into the polymer network, but they may otherwise be retained and/or encapsulated in the polymer network. Some polymer chains may diffuse into the borehole water to form small regions of uncrosslinked polymer gels. Diffusion of polymer chains may occur before and/or after the polymer network has formed. However, generally, a substantial proportion of the composition will be incorporated into the polymeric material rather than form uncrosslinked gels. The terms polymeric material and polymeric network are used throughout and can be used interchangeably.

The composition can be configured to form a polymeric material having a surface that forms a slidable membrane against the wall of the borehole such that a drill located in the borehole is able to move axially relative the polymer. Because a slidable membrane can be formed, there may be no need to rotate drill string 144 during and/or after injection of the composition during formation of the polymeric material since the polymeric material will be unable to stick to the drill string 144. This can be advantageous as it allows greater operating conditions in which to inject and form the polymerication material in the borehole. In some embodiments, the drill string is rotated at about 50-150 rpm as the composition is injected into the borehole. In an embodiment, the composition is injected into the borehole using a pump rate of about 40-60 liters per minute. However, the actually pump rate may be less or more than 40-60 liters per minute depending on the well conditions. The polymeric material is able to bind loose and fragile material found in a wall of the borehole together preventing further breakdown of the formation from occurring. Therefore, the polymeric material helps to seal off natural and mechanical fractures to prevent fluid loss and flow into or out of the surrounding strata formation.

The composition can be configured to form a non-permeable and hydroscopic membrane. This helps to prevent ingress of ground water into the borehole. The high degree of lubricity displayed by the resulting polymeric material means that, when injected into a borehole, a significant torque and/or friction reduction between formation and downhole equipment is provided. Because the composition forms a polymer network, there may be no need to provide stiffening agents such as fibres to the composition that are generally required for weak or an uncrosslinked gels.

When the composition contacts the aqueous solution, the polymer and crosslinking agent concentrations will generally begin to decrease as the polymer and crosslinking agent are solubilised in the aqueous solution. The amount that the concentration decreases will be determined by the amount of aqueous solution present in the borehole and the volume of the annulus. Generally, the more the polymer and crosslinking agent concentrations are diluted, the looser the polymeric network and the poorer the mechanical properties of the polymeric material. If the composition is viscous enough, for example if the composition is an emulsion, then it may displace the aqueous solution as it is injected into the annulus. This can cause the amount of water available to dissolve the polymer and crosslinking agent to change as more composition is injected into the annulus. The amount of composition injected into the annulus may result in a aqueous solution:composition ratio of about 1:2 to about 5:1. In an embodiment, the aqueous solution:composition ratio is about 1:1. This ratio tends to form polymeric materials with the most favorable mechanical properties to seal natural and mechanical fractures. However, aqueous solution:composition ratio of about 1:2, 2:1, 3:1 or 4:1 may be used depending on the strata and borehole conditions.

The polymer may be an ionic polymer. The ionic polymer can be (meth)acryloyl-based.

For example, the ionic polymer can be polyacrylamide-based. In an embodiment, the polymer is a partially hydrolysed polyacrylamide. The polymer may be in the form of a co-polymer. The ionic polymer can have a charge density in a range of about 5-50%. For example, in an embodiment, the charge density is about 20-35%. The polymer contains moieties capable of reacting with the crosslinking agent to form a polymer network. For example, the polymer and crosslinker may form a polymer network through Michael Additions or the formation of a Lewis Adduct.

The composition may be self-gelling. The term self-gelling is to be interpreted broadly to mean a composition that does require any further components such as initiators to form the polymer network. The self-gelling composition may form the polymer network by contact with the aqueous solution alone. However, it should be appreciated that other components, such as pH regulators, may be used to facilitate the formation of the polymer network, but these other components are not always required.

The crosslinking agent can be an ionic crosslinking agent. For example, the ionic crosslinking agent can be a metal salt. The metal salt may be a mono-, di- or trivalent metal salt. In an embodiment, the metal salt is $Al_2(SO_4)_3$. Salts of metals and/or metals oxides of other multivalent metals can be used, such as Fe. In some embodiments, non-metal salts may be used, such as salts derived from boric acid and/or salts derived from organic compounds. A combination of crosslinking agents may be used. For example, a combination of different metal salts and/or non-metal salts can be used. In an embodiment, the polymer is anionic and the crosslinking agent is cationic. However, in some embodiments the polymer is cationic and the crosslinking agent is anionic. In some embodiments, the crosslinking agent is an organic-based compound. The organic-based compound may be a di(meth)acrylate. The di(meth)acrylate may be ethylene glycol dimethacrylate. The pH of the aqueous solution may affect the gelling time. In some embodiments, higher pH values decreases the gelling time compared to lower pH values.

In some embodiments, the composition may comprise from about 0.01 to about 10 wt. % crosslinking agent based on the weight of the composition. For example, the composition may comprise about 0.01, 0.1, 0.5, 1, 2, 3, 4, 5, 6, 7, 8, 9, or 10 wt. % crosslinking agent. The weight of the composition may be determined by the weight of the emulsion. The amount of crosslinking agent may be determined by the natural and mechanical fractures and the mechanical properties of the polymeric material to support these features. Generally, more crosslinking agent will stiffen the polymer network compared to polymer networks with less crosslinking agent.

The volume of composition injected into the borehole is dependent on the dimensions of the borehole and associated drill string, and the condition of the borehole wall. In an embodiment, 4-6 L of the composition is injected into a borehole.

The composition may also include an expanding agent. The expanding agent can be configured to expand the composition during crosslinking once the composition contacts the aqueous solution. This means that the polymeric material may be in the form of a polymeric sponge. The expanding agent can help to ensure that the composition is sufficiently troweled into fissures and other defected areas of the borehole wall. In this way, the expanding agent can be considered an expandable grout. The use of the expanding agent helps to generate a more rigid polymeric material and also results in the composition expanding prior to being fully set so the volume of the polymeric material available to plug large volume loss zones is greater than the initial volume of composition injected. This combination helps to maintain a high degree of lubricity and therefore still aids in overall torque reduction of the use of a drill string in the borehole. The expanding agent can be a disocyanate capable of forming an expanded polyurethane-based foam. The expanding agent in some embodiments is injected into the borehole at the same time as the composition is injected into the borehole.

An embodiment provides a method of forming a polymeric material that stabilises a wall of a borehole. The method includes injecting a composition comprising a polymer and a crosslinking agent into an aqueous solution located in an annulus formed between a drill located in the borehole and the wall borehole. The method also includes allowing the composition to gel to form a polymeric material having a Young Modulus in the range of about 0.01-5 GPa, a tensile strength in the range of about 1-100 MPa, and a breaking elongation in the range of about 100%-1000%.

Hard water generally adversely affects the formation of polymeric networks, and this leads to a reduction in the bond strength of the resulting material and increases the time required to form the polymeric material. When hard water is present in the borehole, a booster may be injected into the borehole to allow the formation of the polymeric material. The booster contains carboxylic acids. Without being bound by theory, it is thought that the carboxylic acids selectively bind ions such as calcium and magnesium so as to prevent these ions from interfering with crosslinking during formation of the polymeric material. Therefore, injection of a booster into the borehole helps to reduce the concentration magnesium and calcium ions in the bore water. The booster can be injected into the borehole before or after the composition is injected into the borehole. In some embodiments, the booster is injected after the composition is injected into the borehole.

The booster can be in the form of a vegetable oil. To ensure that the vegetable oil can mix with the bore water to extract calcium and magnesium ions, the booster is agitated as it is injected into the borehole. Typically the site that the booster and/or composition is injected into the borehole is about 50-300 mm, such as 100-200 mm, from a floor of the borehole. If the booster is injected with sufficient pressure, such as about 800-900 psi, then the head of the drill string 141 and borehole formations will tend to form a tortuous flow path that will agitate the booster. Alternatively, the head of the drill string 141 may have apertures and other features that agitate the booster as it is being injected into the borehole. Pressures of about 800-900 psi can be used to inject the composition into the annulus, although this pressure depends on the borehole conditions and the fractures to be filled with the composition.

In some embodiment, the use of the booster allows the polymeric material to form with a total hardness of above 1,000 mg/L. In some embodiment, the booster allows the polymeric material to form with a total hardness of above 40,000 mg/L. In some embodiment, the booster allows the polymeric material to form in bore water saturated with calcium and/or magnesium ions. The amount of booster required depends on the borehole conditions. However, generally, the booster is added as a ratio of about 5%-50% by volume to the volume of the composition. In some embodiments, the booster is added as a ratio of about 10%-30%, such as 10%-20%, by volume to the volume of the composition. In an embodiment, approximately 0.8-1.2 L of booster is injected into the borehole after injecting about 4-6 L of composition has been injected into the well.

The composition may be injected into the borehole using the system as set forth above.

Whilst a number of specific system and method embodiment have been described, it should be appreciated that the system and method may be embodied in many other forms. For example the gap 64 which allows the flowable substance S to flow out of the body 12 is currently described as being created by virtue of an increased inner diameter of the second portion 16. However in an alternate embodiment the gap (or a plurality of gaps) 64 can be created in the second portion 16 by keeping the inner diameter of the second portion 16 the same as that of the first portion 14 but forming one or more flutes, grooves or other recesses in the inner surface of the second portion 16 through which the substance S can bypass the sealing structure 22 on the plugs P when in the second portion 16. Also, a drill 142 is currently described and depicted as being the transport mechanism through which the system 10 can be transported or otherwise delivered to the remote location. However any other type of conduit may be used which is provided with a seat or other stop mechanism for engaging the valve 66.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the method and system as disclosed herein.

The invention claimed is:

1. A system for delivery of a flowable substance to a remote location comprising;
    a body having an up hole end, a down hole end and one or more sealed regions located between the up hole end and the down hole end, wherein the one or more sealed regions are configured for holding respective volumes of the flowable substance, the body further comprising a first portion and a second portion, the system further comprising at least two plugs both being moveable in an axial direction within the body, the at least two plugs being associated with the body wherein; in a first configuration of the at least two plugs, a first plug and a second plug are spaced apart in the first portion of the body and together with an inner surface of the first portion from a sealed region for holding a volume of the flowable substance; and, in a second configuration of the plugs, at least the second plug is disposed in the second portion wherein the flowable substance can flow in a downstream direction past or through the second plug and out of the body in response to the application of a force on the first plug in a direction toward the second plug; and
    a first valve at the downhole end for controlling flow of fluid into and out of the body, the first valve having and open state and a closed state, wherein the closed state of the first valve prevents fluid from entering or exiting the body while allowing a bypass flow of fluid through the first valve to facilitate travel of the system through a column of the fluid.

2. The system according to claim 1 further comprising a fluid pressure activated one-way valve located upstream of the at plugs and arranged to allow a flow of fluid in a direction through the body toward the first valve while blocking a flow of fluid in direction from the first valve to the one-way valve.

3. The system according to claim 1, wherein the second plug comprises a sealing member, and the body and sealing member are relatively configured so that when the second plug is in the first configuration the sealing member forms a seal against an inside surface of the first portion of the body, and when the second plug is in the second configuration the flowable substance is able to flow between the sealing member and an inside surface of the second portion of the body.

4. The system according to claim 3, wherein the second portion of the body is formed with an inner diameter greater than an outer diameter of the sealing member.

5. The system according to claim 4 comprising a centraliser located about the body, the centraliser having an outer surface that fits within a circle of radius R smaller than an inner radius of the conduit and larger than an outer radius of the body, the outer surface is provided with one or more recessed surface portions that lie within the radius R.

6. The system according to claim 1, comprising at least two of the sealed regions which respectively contain flowable substances of different composition and/or function.

7. The system according to claim 1, wherein one or more of: (a) the number of plugs; (b) an axial length of any one of the plugs; or (c) an axial length of the second portion are arranged so that, in a third configuration of the plugs where axially adjacent plugs are in mutual abutment and a plug closest to a downstream end of the body is in the second portion, the body together with the plugs forms a flushing fluid flow path allowing fluid which flows into the body upstream of the plugs to flow past the plugs and out of the body.

8. The system according to claim 1, wherein one or more of: (a) the number of plugs; (b) an axial length of any one of the plugs; or (c) an axial length of the second portion are arranged so that, in a third configuration of the plugs where axially adjacent plugs are in mutual abutment the second plug being closest to a downstream end of the body is in the second portion and the first plug being most distant the first plug is positioned to form a seal with the first portion to thereby substantially prevent fluid which flows into the body upstream of the plugs to flow past the plugs and out of the body.

9. The system according to claim 1, wherein the flowable substance is a composition for use in forming a polymeric material that stabilises a wall of a borehole, comprising:
    a polymer and a crosslinking agent,
    wherein the composition is injectable into an annulus formed between a drill located in the borehole and the wall, and
    wherein, when exposed to an aqueous solution located in the annulus, the composition forms a polymeric material having a Young Modulus in the range of about 0.01-5 GPa, a tensile strength in the range of about 1-100 MPa, and a breaking elongation in the range of about 100%-1000%.

10. The system according to claim 9, wherein the polymer and the crosslinking agent are configured to form a polymeric material having a surface that forms a slidable membrane against the wall of the borehole such that a drill located in the borehole is able to move axially relative the polymer.

11. The system according to claim 9, wherein the polymer, and crosslinking agent are configured to form a non-permeable and hydroscopic membrane.

12. The system according to claim 9, wherein the composition is configured to gel in the borehole in a range of about 10 seconds to 60 minutes after the composition has contacted the aqueous solution.

13. The system according to claim 9, further comprising an expanding agent that is configured to expand the composition during crosslinking once the composition contacts the aqueous solution so as to form a polymeric sponge.

14. The system according to claim 1, wherein the open state of the first valve allows flow of the flowable substance out of the body; and wherein the closed state of the first valve prevents flow of the flowable substance out of the body and prevents flow of the fluid into or out of the body while allowing flow of the bypass flow of fluid in an upstream direction through the first valve.

15. The system according to claim 1, comprising at least two plugs being spaced apart from each other within the body, wherein the one or more sealed regions is defined between the plugs and an inner surface of the body.

16. The system according to claim 1, wherein the body is dimensioned to travel inside a conduit comprising the column of the fluid.

17. The system according to claim 1, wherein the flowable substance is a hydro activated polymer.

18. A method of stabilising or sealing one or more regions of a borehole comprising:
   loading a volume of a flowable substance into the sealed region of a body of a system in accordance with claim 1;
   transporting the body containing the flowable substance through a conduit to a dispensing location adjacent the one or more regions of the borehole;
   applying a force to slide the first plug, the flowable substance and the second plug in a downstream direction into a configuration where a gap is formed between the inner surface of the body and the second plug wherein the force forces the flowable substance to flow out of the body.

19. A method according to claim 18, wherein the flowable substance flows out of the body into the borehole and at least partially in an up-hole direction into an annulus created between the conduit and the region of a borehole.

20. A method according to claim 18, wherein the flowable substance is a hydro-activated polymer formulated to form a non-permeable and hygroscopic membrane.

21. A method according to claim 18, comprising forming a continuous self-lubricating hygroscopic and water proof barrier on the wall of the borehole formed by a ground drill.

22. The method according to claim 20 wherein the flowable substance further comprises a crosslinking agent and, further comprising injecting a booster into the borehole to allow the polymer and crosslinking agent to react to form the non-permeable and hygroscopic membrane in hard water.

23. A method of forming a substantially continuous self-lubricating hygroscopic and water proof barrier on a wall of a borehole formed by a ground drill the method comprising:
   after drilling a length of the borehole using a ground drill having a drill string and a drill bit, maintaining the drill string in the hole to form an annulus between the drill string and a wall of the borehole;
   injecting a volume of flowable hydro-activated polymer into the annulus through the drill string;
   rotating the drill string while the hydro-activated polymer reacts with water in the annulus to form a self-lubricating hygroscopic and waterproof barrier on the wall of the borehole for the length of the borehole;
   wherein the volume of flowable hydro-activated polymer is transported through the drill string by a system according to claim 1.

* * * * *